(12) United States Patent
He et al.

(10) Patent No.: US 12,511,860 B2
(45) Date of Patent: Dec. 30, 2025

(54) APPEARANCE ANALYSIS METHOD AND ELECTRONIC DEVICE

(71) Applicant: Huawei Technologies Co., Ltd., Shenzhen (CN)

(72) Inventors: Xiaoxiang He, Shenzhen (CN); Hongwei Hu, Beijing (CN); Yuewan Lu, Shenzhen (CN); Wenmei Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 408 days.

(21) Appl. No.: 18/006,312

(22) PCT Filed: Jul. 16, 2021

(86) PCT No.: PCT/CN2021/106703
§ 371 (c)(1),
(2) Date: Jan. 20, 2023

(87) PCT Pub. No.: WO2022/017270
PCT Pub. Date: Jan. 27, 2022

(65) Prior Publication Data
US 2023/0298300 A1   Sep. 21, 2023

(30) Foreign Application Priority Data

Jul. 24, 2020  (CN) .......................... 202010725551.X

(51) Int. Cl.
*G06V 10/24* (2022.01)
*G06V 40/16* (2022.01)

(52) U.S. Cl.
CPC .............. *G06V 10/24* (2022.01); *G06V 40/16* (2022.01)

(58) Field of Classification Search
CPC .... H04N 23/6845; G06V 10/24; G06V 10/25; G06V 10/806; G06V 20/64; G06V 40/16;
(Continued)

(56) References Cited

U.S. PATENT DOCUMENTS

2002/0164054 A1* 11/2002 Mccartney ............. G06V 40/16
382/118
2005/0025347 A1*  2/2005 Makram-Ebeid ......... G06T 7/33
382/128
(Continued)

FOREIGN PATENT DOCUMENTS

CN       105455522 A    4/2016
CN       105872405 A    8/2016
(Continued)

*Primary Examiner* — Michael Horabik
*Assistant Examiner* — Stefano Anthony Dardano
(74) *Attorney, Agent, or Firm* — Conley Rose, P.C.

(57) ABSTRACT

An appearance analysis method includes an electronic device obtaining a first image associated with a first region of an object and a second image associated with a second region of the object, where the first image is collected by a first camera, where the second image is collected by a second camera, and wherein the first region is different from the second region. The electronic device provides an appearance evaluation of the object, where the appearance evaluation is determined based on the first image and the second image.

17 Claims, 12 Drawing Sheets

(58) Field of Classification Search
CPC .. G06V 40/165; G06V 40/171; G06V 40/168; G06T 2207/30201; G06T 2207/30088; G06T 7/90; G06T 2207/30196; G06T 7/248; G06T 7/33; G06T 7/68; G06T 7/73; A61B 5/444
See application file for complete search history.

(56) References Cited

U.S. PATENT DOCUMENTS

| | | | | |
|---|---|---|---|---|
| 2011/0150322 | A1* | 6/2011 | Bedros | G06V 40/168 |
| | | | | 382/154 |
| 2012/0140069 | A1* | 6/2012 | Ding | H04N 21/6582 |
| | | | | 348/143 |
| 2016/0162728 | A1* | 6/2016 | Arai | G06V 10/443 |
| | | | | 382/118 |
| 2019/0180506 | A1* | 6/2019 | Gebbie | G06T 19/00 |
| 2019/0214126 | A1* | 7/2019 | Goetz | A61B 6/563 |
| 2020/0151852 | A1* | 5/2020 | Wang | G06T 3/4053 |
| 2021/0150186 | A1* | 5/2021 | Lehman | G06V 40/171 |
| 2022/0237811 | A1* | 7/2022 | Cai | G06T 7/40 |

FOREIGN PATENT DOCUMENTS

| | | | |
|---|---|---|---|
| CN | 106126017 A | | 11/2016 |
| CN | 107485157 A | | 12/2017 |
| CN | 304619498 S | | 5/2018 |
| CN | 108095698 A | | 6/2018 |
| CN | 108399364 A | * | 8/2018 |
| CN | 109315994 A | | 2/2019 |
| CN | 110045872 A | * | 7/2019 |

* cited by examiner

APPEARANCE ANALYSIS METHOD AND ELECTRONIC DEVICE

CROSS-REFERENCE TO RELATED APPLICATIONS

This is a U.S. National Stage of International Patent Application No. PCT/CN2021/106703 filed on Jul. 16, 2021, which claims priority to Chinese Patent Application No. 202010725551.X filed on Jul. 24, 2020. Both of the aforementioned applications are hereby incorporated by reference in their entireties.

TECHNICAL FIELD

The present disclosure relates to the field of electronic technologies, and in particular, to an appearance analysis method and an electronic device.

BACKGROUND

With the development of technologies, some intelligent terminal devices can collect an image of an object (such as a person), and provide an appearance evaluation of the object through image analysis. For example, some applications of a smartphone may collect an image of a human face by using a camera of the smartphone, and provide an evaluation of a skin condition of the human face, For example, some intelligent mirrors may collect the image of the human face by using the camera, and provide a score of facial attractiveness of the object, estimate the age of the object, or the like.

However, various existing intelligent terminal devices generally collect an image of a user by using a front-facing camera, and therefore an image region collected by the intelligent terminal device is limited. For example, when an image of a human face is collected by using the camera of the smartphone, the collected image is usually a face photo of a front face of the user, and it is difficult to collect specific regions of a left cheek and a right cheek. This seriously affects accuracy of the appearance evaluation.

SUMMARY

The present disclosure provides an appearance analysis method and an electronic device.

According to a first aspect, an embodiment of the present disclosure provides an appearance analysis method, and the method may be applied to an electronic device including a first camera and a second camera. The method includes: The electronic device obtains a first image collected by the first camera and a second image collected by the second camera, where the first image is an image of a first region of a user, and the second image is an image of a different second area of the user. Then, the electronic device provides an appearance evaluation of an object, where the appearance evaluation is determined based on the first image and the second image. In some implementations, the appearance evaluation may be determined by the electronic device. In another implementation, the appearance evaluation may be determined, for example, by another device (such as a server) different from the electronic device.

The appearance evaluation of the object is obtained based on a plurality of images collected by different cameras, so that accuracy of the provided appearance evaluation can be improved in this embodiment of the present disclosure. In an example implementation, a plurality of images of the object such as a left-face image, a front-face image, and a right-face image of the object may be simultaneously obtained in this embodiment of the present disclosure, so that an appearance evaluation of a face of the object can be more accurately determined.

In some implementations, the electronic device may further determine whether a posture or a posture of the object meets an image collection condition of the first camera or the second camera. If the position or the posture of the object does not meet the image collection condition, the electronic device may indicate the object to adjust the position or the posture. For example, the electronic device may indicate, by using voice, the object to adjust the position to be closer to or farther from the camera. Alternatively, the electronic device may intuitively indicate, by using an animation on a presentation device, the object to deflect the head to the right.

The position or the posture of the object is prompted, so that in this embodiment of the present disclosure, the object can be located at a position or a posture that is more suitable for image collection. Therefore, a better image of the object can be obtained, so that accuracy of the appearance evaluation can be further improved.

In some implementations, the electronic device may further adjust a collection parameter of at least one of the first camera and the second camera based on a feature of the object. For example, the collection parameter includes at least one of a photographing angle and a focal length.

In this manner, in this embodiment of the present disclosure, the collection parameter of the camera may be dynamically adjusted for different objects, so that a case in which a fixed collection parameter may not be applicable to a specific object is avoided, and therefore universality of the solution can be improved. In addition, the collection parameter is adjusted, so that in the present disclosure, quality of an obtained image of the object can be further improved, and therefore accuracy of the appearance evaluation is improved.

In some implementations, the first camera and the second camera are symmetrically arranged on opposite sides of an image collection device. For example, the first camera may be arranged on a leftmost side of the image collection device, and the second camera may be arranged on a corresponding rightmost side.

In such an arrangement, a combination of the first camera and the second camera can collect a more comprehensive image of the object, so that accuracy of the appearance evaluation is improved. Because the first camera and the second camera are symmetrically arranged, the first image and the second image that are collected by the first camera and the second camera are also symmetrical. In some implementations, when the image is analyzed by using an image analysis engine, in an implementation of the present disclosure, the second image may be further horizontally flipped, so that the first image and the flipped second image can be processed by using a same image analysis engine. For example, in an implementation of the present disclosure, a left-face analysis engine may be used to simultaneously process a left-face image and a flipped right-face image, so that development costs are reduced.

In some implementations, the electronic device further includes a third camera, the third camera is disposed on the image collection device, and a distance between the third camera and the first camera and a distance between the third camera and the second camera are the same. The electronic device may further obtain a third image collected by the third camera, and the third image may be about a third region of the object. For example, for a circular-shaped image collection device, the first camera and the second camera may be symmetrically disposed on a left side and a right side of the image collection device, and the third camera may be disposed on a central axis of the image collection device, for example, the top or the bottom of the image collection device. In such an arrangement manner, in this embodiment of the present disclosure, a more comprehensive image of the object may be obtained, so that accuracy of the appearance evaluation is improved.

In some implementations, the electronic device may determine the appearance evaluation based on the first image and the second image. Specifically, the electronic device may determine a first region of interest from the first image, and determine a second region of interest from the second image. The first region of interest represents a first group of appearance features of the object, and the second region of interest represents a second group of appearance features of the object. Then, the electronic device may determine the appearance evaluation of the appearance feature of the object based on at least the first region of interest and the second region of interest.

In some implementations, the electronic device may determine a corresponding region of interest by detecting a plurality of feature points in the image. For example, the electronic device may pre-store a correspondence between an appearance feature and a group of feature points, detect corresponding feature points from a corresponding image, and determine a region surrounded by these feature points as a corresponding region of interest. For example, the appearance feature may include but is not limited to: a pore feature, a colored patch feature, a wrinkle feature, a red region feature, a pimple feature, a dark circle feature, a blackhead feature, or any combination of the foregoing. Corresponding regions of interest are set for different appearance features, so that in an implementation of the present disclosure, detection results of different images can be effectively fused, and execution of a plurality of types of appearance analysis based on the obtained images can also be supported.

In some implementations, in a process of determining the appearance evaluation, if the first region of interest and the second region of interest include an overlapping region, the electronic device may determine, based on the first region of interest, a first appearance evaluation corresponding to the overlapping region, and determine, based on the second region of interest, a second appearance evaluation corresponding to the overlapping region. Then, the electronic device may determine the appearance evaluation of the appearance feature of the object based on the first appearance evaluation and the second appearance evaluation.

For example, for the overlapping region, the electronic device may calculate, for example, an average value of the first appearance evaluation and the second appearance evaluation, and use the average value as the appearance evaluation of the appearance feature. For example, the first appearance evaluation may be a quantity of pores that is in the overlapping region and that is determined based on the first image, and the second appearance evaluation may be a quantity of pores that is in the overlapping region and that is determined based on the second image. The electronic device may determine an average value of the two quantities of pores as a quantity of pores in the overlapping region.

In this manner, in an implementation of the present disclosure, an appearance evaluation of the overlapping region may be determined based on a plurality of images collected from different angles, so that a problem that an appearance evaluation result is not accurate enough due to incomprehensive image collection is avoided.

In some implementations, the electronic device may present at least a three-dimensional model of the object. For example, the three-dimensional model may be generated by the electronic device based on at least the first image and the second image. Then, the electronic device may present corresponding content in the appearance evaluation at different positions of the three-dimensional model.

The three-dimensional model rather than a simple two-dimensional image is presented, so that in an implementation of the present disclosure, the appearance evaluation of the object can be more intuitively presented. In some implementations, a presentation angle of the three-dimensional model may also change in response to an operation of the user, so that it is convenient for the user to more conveniently view an appearance evaluation of a specific region.

In some implementations, the appearance evaluation includes at least one of a skin evaluation and an appearance score. Examples of the skin evaluation applicable to the present disclosure may further include: a pore evaluation, a colored patch evaluation, a wrinkle evaluation, a red region evaluation, a pimple evaluation, a dark circle evaluation, a blackhead evaluation, another skin evaluation that may be determined by using image analysis, or a combination of any one of the foregoing.

According to a second aspect, an embodiment of the present disclosure provides a terminal device. The terminal device includes: at least one computing unit; and at least one memory, where the at least one memory is coupled to the at least one computing unit and stores instructions to be executed by the at least one computing unit, and when the instructions are executed by the at least one computing unit, the terminal device is enabled to obtain a first image collected by a first camera and a second image collected by a second camera. The first image is an image of a first region of a user, and the second image is an image of a different second area of the user. Then, the terminal device provides an appearance evaluation of an object, where the appearance evaluation is determined based on the first image and the second image. In some implementations, the appearance evaluation may be determined by the terminal device. In another implementation, the appearance evaluation may be determined, for example, by another device (such as a server) different from the terminal device.

The terminal device may be a smart terminal that has a computing capability, and examples of the terminal device include but are not limited to a desktop computer, a notebook computer, a tablet computer, a smartphone, a smartwatch, smart glasses, an e-book, or the like. In some implementations, the first camera and the second camera may be a front-facing camera or a rear-facing camera built in the terminal device. Alternatively, one of the first camera and the second. camera may be a built-in camera, and the other may be an external camera that is communicatively connected to the terminal device. Alternatively, both the first camera and the second camera may be external cameras that are communicatively connected to the terminal device.

The appearance evaluation of the object is obtained based on a plurality of images collected by different cameras, so that accuracy of the provided appearance evaluation can be improved in this embodiment of the present disclosure. In an example implementation, a plurality of images of the object such as a left-face image, a front-face image, and a right-face image of the object may be simultaneously obtained in this embodiment of the present disclosure, so that an appearance evaluation of a face of the object can be more accurately determined.

In some implementations, the terminal device may further determine whether a posture or a posture of the object meets an image collection condition of the first camera or the second camera. If the position or the posture of the object does not meet the image collection condition, the terminal device may indicate the object to adjust the position or the posture. For example, the terminal device may indicate, by using voice, the object to adjust the position to be closer to or farther from the camera. Alternatively, the terminal device may intuitively indicate, by using an animation on a presentation device, the object to deflect the head to the right.

The position or the posture of the object is prompted, so that in this embodiment of the present disclosure, the object can be located art a position or a posture that is more suitable for image collection. Therefore, a better image of the object can be obtained, so that accuracy of the appearance evaluation can be further improved.

In some implementations, the terminal device may further adjust a collection parameter of at least one of the first camera and the second camera based on a feature of the object. For example, the collection parameter includes at least one of a photographing angle and a focal length.

In this manner, in this embodiment of the present disclosure, the collection parameter of the camera may be dynamically adjusted for different objects, so that a case in which a fixed collection parameter may not be applicable to a specific object is avoided, and therefore universality of the solution can be improved. In addition, the collection parameter is adjusted, so that in the present disclosure, quality of an obtained image of the object can be further improved, and therefore accuracy of the appearance evaluation is improved.

In some implementations, the terminal device may further obtain a third image collected by a third camera, and the third image may be about a third region of the object. The third camera may be a built-in camera of the terminal device or an external camera that is communicatively connected to the terminal device, and the third camera may be arranged at a same distance from the first camera and the second camera. In such an arrangement manner, in this embodiment of the present disclosure, a more comprehensive image of the object may be obtained, so that accuracy of the appearance evaluation is improved.

In some implementations, the terminal device may determine the appearance evaluation based on the first image and the second image. Specifically, the terminal device may determine a first region of interest from the first image, and determine a second region of interest from the second image. The first region of interest represents a first group of appearance features of the object, and the second region of interest represents a second group of appearance features of the object. Then, the terminal device may determine the appearance evaluation of the appearance feature of the object based on at least the first region of interest and the second region of interest.

In some implementations, the terminal device may determine a corresponding region of interest by detecting a plurality of feature points in the image. For example, the terminal device may pre-store a correspondence between an appearance feature and a group of feature points, detect corresponding feature points from a corresponding image, and determine a region surrounded by these feature points as a corresponding region of interest. For example, the appearance feature may include but is not limited to: a pore feature, a colored patch feature, a wrinkle feature, a red region feature, a pimple feature, a dark circle feature, a blackhead feature, or any combination of the foregoing. Corresponding regions of interest are set for different appearance features, so that in an implementation of the present disclosure, detection results of different images can be effectively fused, and execution of a plurality of types of appearance analysis based on the obtained images can also be supported.

In some implementations, in a process of determining the appearance evaluation, if the first region of interest and the second region of interest include an overlapping region, the terminal device may determine, based on the first region of interest, a first appearance evaluation corresponding to the overlapping region, and determine, based on the second region of interest, a second appearance evaluation corresponding to the overlapping region. Then, the terminal device may determine the appearance evaluation of the appearance feature of the object based on the first appearance evaluation and the second appearance evaluation.

For example, for the overlapping region, the terminal device may calculate, for example, an average value of the first appearance evaluation and the second appearance evaluation, and use the average value as the appearance evaluation of the appearance feature. For example, the first appearance evaluation may be a quantity of pores that is in the overlapping region and that is determined based on the first image, and the second appearance evaluation may be a quantity of pores that is in the overlapping region and that is determined based on the second image. The terminal device may determine an average value of the two quantities of pores as a quantity of pores in the overlapping region.

In this manner, in an implementation of the present disclosure, an appearance evaluation of the overlapping region may be determined based on a plurality of images collected from different angles, so that a problem that an appearance evaluation result is not accurate enough due to incomprehensive image collection is avoided.

In some implementations, the terminal device may present at least a three-dimensional model of the object. For example, the three-dimensional model may be generated by the terminal device based on at least the first image and the second image. Then, the terminal device may present corresponding content in the appearance evaluation at different positions of the three-dimensional model.

The three-dimensional model rather than a simple two-dimensional image is presented, so that in an implementation of the present disclosure, the appearance evaluation of the object can be more intuitively presented. In some implementations, a presentation angle of the three-dimensional model may also change in response to an operation of the user, so that it is convenient for the user to more conveniently view an appearance evaluation of a specific region.

In some implementations, the appearance evaluation includes at least one of a skin evaluation and an appearance score. Examples of the skin evaluation applicable to the present disclosure may further include: a pore evaluation, a colored patch evaluation, a wrinkle evaluation, a red region evaluation, a pimple evaluation, a dark circle evaluation, a blackhead evaluation, another skin evaluation that may be determined by using image analysis, or a combination of any one of the foregoing.

According to a third aspect, an implementation of the present disclosure provides an image collection device. The image collection device includes a first camera, a second camera, and a communication component. The first camera is configured to collect a first image associated with a first region of an object. The second camera is configured to collect a second image associated with a second region of the object, and the first region is different from the second region. The communication component is configured to provide the first image and the second image for a terminal device, to determine an appearance evaluation of the object.

In such an arrangement, the image collection device provided in the present disclosure can more comprehensively collect an image of the object, so that accuracy of the determined appearance evaluation can be improved.

In some implementations, the first camera and the second camera are symmetrically arranged on opposite sides of the image collection device. For example, the first camera may be arranged on a leftmost side of the image collection device, and the second camera may be arranged on a corresponding rightmost side.

In such an arrangement, a combination of the first camera and the second camera can collect a more comprehensive image of the object, so that accuracy of the appearance evaluation is improved. Because the first camera and the second camera are symmetrically arranged, the first image and the second image that are collected by the first camera and the second camera are also symmetrical. In some implementations, when the image is analyzed by using an image analysis engine, in an implementation of the present disclosure, the second image may be further horizontally flipped, so that the first image and the flipped second image can be processed by using a same image analysis engine. For example, in an implementation of the present disclosure, a left-face analysis engine may be used to simultaneously process a left-face image and a flipped right-face image, so that development costs are reduced.

In some implementations, the image collection device further includes a third camera, and the third camera is disposed at a same distance from the first camera and the second camera. The image collection device may further provide, by using the communication component, a third image collected by the third camera. For example, for a circular-shaped image collection device, the first camera and the second camera may be symmetrically disposed on a left side and a right side of the image collection device, and the third camera may be disposed on a central axis of the image collection device, for example, the top or the bottom of the image collection device. In such an arrangement manner, in this embodiment of the present disclosure, a more comprehensive image of the object may be obtained, so that accuracy of the appearance evaluation is improved, In some implementations, the appearance evaluation includes at least one of a skin evaluation and an appearance score. Examples of the skin evaluation applicable to the present disclosure may further include: a pore evaluation, a colored patch evaluation, a wrinkle evaluation, a red region evaluation, a pimple evaluation, a dark circle evaluation, a blackhead evaluation, another skin evaluation that may be determined by using image analysis, or a combination of any one of the foregoing.

According to a fourth aspect, an embodiment of the present disclosure provides an appearance analysis system, including the terminal device according to the second aspect and the image collection device according to the third aspect.

According to a fifth aspect, an appearance analysis apparatus is provided. The appearance analysis apparatus may include a first image obtaining unit, a second image obtaining unit, and an evaluation providing unit. Specifically, the first image obtaining unit is configured to obtain a first image associated with a first region of an object, and the first image is collected by a first camera. The second image obtaining unit is configured to obtain a second image associated with a second region of the object, the second image is collected by a second camera, and the first region is different from the second region. The evaluation providing unit is configured to provide an appearance evaluation of the object, and the appearance evaluation is determined based on the first image and the second image.

In some implementations, the appearance analysis apparatus further includes an object prompting unit, configured to: if a position or a posture of the object does not meet an image collection condition of the first camera or the second camera, indicate, by an electronic device, the object to adjust the position or the posture.

In some implementations, the appearance analysis apparatus further includes a camera adjustment unit, configured to: adjust, by the electronic device, a collection parameter of at least one of the first camera and the second camera based on a feature of the object, where the collection parameter includes at least one of a photographing angle and a focal length.

In some implementations, the first camera and the second camera are symmetrically arranged on opposite sides of an image collection device.

In some implementations, the electronic device further includes a third camera, and the appearance analysis apparatus further includes a third image obtaining unit, configured to: obtain a third image associated with a third region of the object, where the third image is collected by the third camera, the third camera is disposed on the image collection device, and a distance between the third camera and the first camera and a distance between the third camera and the second camera are the same.

In some implementations, the appearance analysis apparatus further includes an evaluation determining unit, configured to: determine a first region of interest from the first image, where the first region of interest represents a first group of appearance features of the object; determine a second region of interest from the second image, where the second region of interest represents a second group of appearance features of the object; and determine the appearance evaluation of the appearance feature of the object based on at least the first region of interest and the second region of interest.

In some implementations, the evaluation determining unit is further configured to: if the first region of interest and the second region of interest include an overlapping region, determine, based on the first region of interest, a first appearance evaluation corresponding to the overlapping region; determine, based on the second region of interest, a second appearance evaluation corresponding to the overlapping region; and determine the appearance evaluation of the appearance feature of the object based on the first appearance evaluation and the second appearance evaluation.

In some implementations, the evaluation providing unit is further configured to: present a three-dimensional model of the object, where the three-dimensional model is generated based on at least the first image and the second image; and present corresponding content in the appearance evaluation at different positions of the three-dimensional model.

In some implementations, the appearance evaluation includes at least one of a skin evaluation and an appearance score. Examples of the skin evaluation applicable to the present disclosure may further include: a pore evaluation, a colored patch evaluation, a wrinkle evaluation, a red region evaluation, a pimple evaluation, a dark circle evaluation, a blackhead evaluation, another skin evaluation that may be determined by using image analysis, or a combination of any one of the foregoing.

According to a sixth aspect, a computer-readable storage medium is provided. One or more computer instructions are stored on the computer-readable storage medium, and the one or more computer instructions are executed by a processor to implement the method in the first aspect or any implementation of the first aspect.

According to a seventh aspect, a computer program product is provided, and when the computer program product is run on a computer, the computer is enabled to execute instructions of some or all steps in the method in the first aspect or any implementation of the first aspect.

It may be understood that the appearance analysis apparatus provided in the fifth aspect. the computer storage medium provided in the sixth aspect, and the computer program product provided in the seventh aspect are all configured to perform the method provided in the first aspect. Therefore, explanations or descriptions of the first aspect are also applicable to the fifth aspect, the sixth aspect, and the seventh aspect. In addition, for beneficial effects that can be achieved in the fifth aspect, the sixth aspect, and the seventh aspect, refer to beneficial effects in the corresponding method. Details are not described herein again.

According to an eighth aspect, an intelligent mirror is provided, and includes: a first camera; a second camera, where the first camera and the second camera are symmetrically arranged on opposite sides of the intelligent mirror; a third camera, where a distance between the third camera and the first camera and a distance between the third camera and the second camera are the same; at least one computing unit; and at least one memory, where the at least one memory is coupled to the at least one computing unit and stores instructions to be executed by the at least one computing unit, and when the instructions are executed by the at least one computing unit, the intelligent mirror is enabled to perform actions, where the actions include: obtaining a first image associated with a first region of an object, where the -first image is collected by the first camera; obtaining a second image associated with a second region of the object, where the second image is collected by the second camera, and the first region is different from the second region; obtaining a third image associated with a third region of the object, where the third image is collected by the third camera; determining an appearance evaluation of the object based on the first image, the second image, and the third image; and providing the appearance evaluation of the object, where the determining an appearance evaluation of the object based on the first image, the second image, and the third image includes: determining a first region of interest from the first image, where the first region of interest represents a first group of appearance features of the object; determining a second region of interest from the second image, where the second region of interest represents a second group of appearance features of the object; determining a third region of interest from the third image, where the third region of interest represents a third group of appearance features of the object; and determining the appearance evaluation of the appearance feature of the object based on at least the first region of interest, the second region of interest, and the third region of interest.

Images separately collected. by the first camera, the second camera, and the third camera are obtained, so that the intelligent mirror provided in the present disclosure can more accurately determine the appearance evaluation of the object, and the determined appearance evaluation can be intuitively provided for a user by using the intelligent mirror.

BRIEF DESCRIPTION OF DRAWINGS

The following describes the accompanying drawings used in embodiments of this application.

DESCRIPTION OF EMBODIMENTS

Figure 1A:
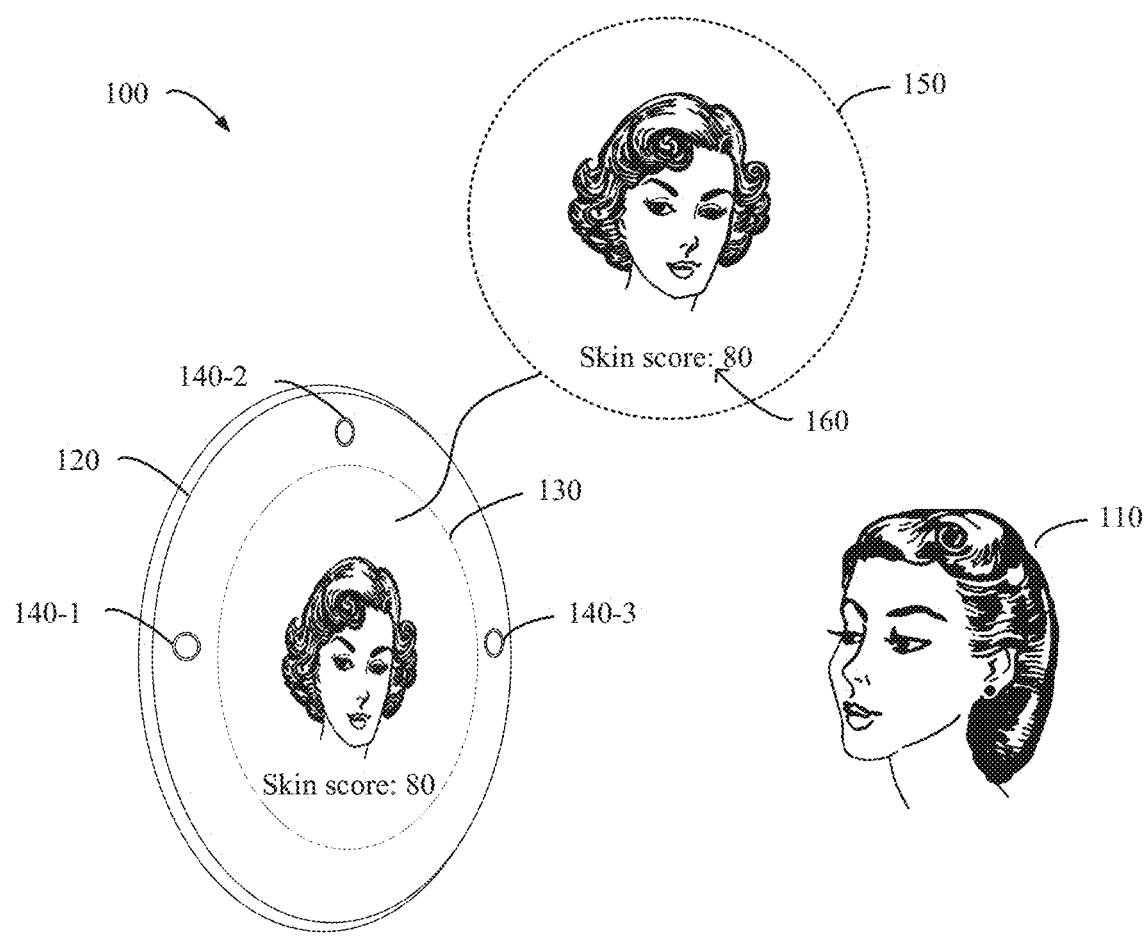
FIG. 1A is a schematic diagram of an example environment in which a plurality of embodiments of the present disclosure can be implemented.

Embodiments of the present disclosure are described in more details below with reference to the accompanying drawings. Although some embodiments of the present disclosure are shown in the accompanying drawings, it should be understood that the present disclosure may be implemented in various forms, and should not be construed as being limited to the embodiments described herein. Instead, these embodiments are provided for a more thorough and complete understanding of the present disclosure. It should be understood that the accompanying drawings and embodiments of the present disclosure are merely used for example purposes and are not intended to limit the protection scope of the present disclosure.

In the descriptions of embodiments of the present disclosure, the term "including" and a similar term thereof shall be understood as open inclusion, that is, "including but not limited to". The term "based on" should be understood as "at least partially based on". The term "one embodiment" or "this embodiment" should be understood as "at least one embodiment". The terms "first", "second", and the like may represent different objects or a same object. Other explicit and implied definitions may also be included below.

As described above, with the development of technologies, some intelligent terminal devices can collect an image of an object (such as a person), and provide an appearance evaluation of the object through image analysis. For example, some applications of a smartphone may collect an image of a human face by using a camera of the smartphone, and provide an evaluation of a skin condition of the human face. For example, some intelligent mirrors may collect the image of the human face by using the camera, and provide a score of facial attractiveness of the object, estimate the age of the object, or the like.

However, various existing intelligent terminal devices generally collect an image of a user by using a front-facing camera, and therefore an image region collected by the intelligent terminal device is limited, For example, when an image of a human face is collected by using the camera of the smartphone, the collected image is usually a face photo of a front face of the user, and it is difficult to collect specific regions of a left cheek and a right cheek. This seriously affects accuracy of the appearance evaluation.

To resolve at least the problem of low accuracy of the appearance evaluation, embodiments of the present disclosure provide an appearance evaluation solution. In embodiments of the present disclosure, an electronic device obtains a first image associated with a first region of an object and a second image associated with a second region of the object, where the first image is collected by a first camera, the second image is collected by a second camera, and the first region is different from the second region; and then, the electronic device provides an appearance evaluation of the object, where the appearance evaluation is determined based on the first image and the second image. In this manner, in embodiments of the present disclosure, a more comprehensive image of the object can be collected without imposing additional burden on a user, so that a more accurate appearance evaluation can be provided.

Specific solutions of the present disclosure are described below with reference to the accompanying drawings.

Example Environment

FIG. 1A is a schematic diagram of an example environment 100 in which a plurality of embodiments of the present disclosure can be implemented. The environment 100 may include an electronic device 120. In the example in FIG. 1A, the electronic device 120 includes a plurality of cameras 140-1, 140-2, and 140-3 (individually or collectively referred to as a camera 140) and a presentation apparatus 130. The electronic device 120 can obtain an image of an object 110 by using the camera 140, and provide an appearance evaluation of the object 110.

For example, in FIG. 1A, the electronic device 120 may be implemented as a device in a form of a mirror. For example, the electronic device 120 may be an intelligent mirror. The plurality of cameras 140 may be arranged at different positions on a periphery of the electronic device 120, and the plurality of cameras 140 may be arranged with at least a predetermined distance. In such an arrangement, a region that is of the object 110 and that can be collected by the camera 140 is not entirely the same as a region that is of the object 110 and that can be collected by another camera.

As shown in FIG. 1A, for example, the electronic device 120 is implemented as a device that is nearly circular. It should be understood that a shape of the electronic device 120 shown in FIG. 1A is merely an example, and may alternatively be implemented as any other appropriate shape, such as a square, a triangle, a rounded rectangle, or an oval.

In some implementations, the plurality of cameras 140 may be embedded, for example, in a housing of the electronic device 120. It should be understood that the plurality of cameras 120 may alternatively be integrated into the electronic device 120 in any other appropriate form, and the present disclosure is not intended to limit an integration manner of the cameras 140.

In some example implementations, the electronic device 120 may include fewer cameras, for example, include only cameras disposed on a left side and a right side of the electronic device 120. Alternatively, the electronic device 120 may include more cameras to more fully collect an image of the user 110.

In some example implementations, at least two of the plurality of cameras 140 may be symmetrically arranged on opposite sides of the electronic device 120 with respect to the electronic device 120. For example, in an example in FIG. 1B, the camera 140-1 may be arranged on a leftmost side of the electronic device 120, and the camera 140-3 is symmetrically arranged on a rightmost side of the electronic device 120. In addition, to more comprehensively collect the image of the object 110. the camera 140-2 may be arranged at a same distance from the camera 140-1 and the camera 140-2. For example, the camera 140-2 may be arranged on the top of the electronic device 120, or the camera 140-2 may be arranged on the bottom of the electronic device 120.

In some implementations, the electronic device 120 may further include the presentation device 130. The presentation device 130 may be implemented, for example, as an electronic display in an appropriate form, and is configured to present a graphical interface 150. In the graphical interface 150, for example, the electronic device 120 may provide an appearance evaluation 160 in a visual manner, such as "Skin score: 80". Additionally, the graphical interface 150 may further present a visual image of the object 110. Various presentation manners of the graphical interface 150 are discussed in detail below, and are not described in detail herein.

Figure 1B:
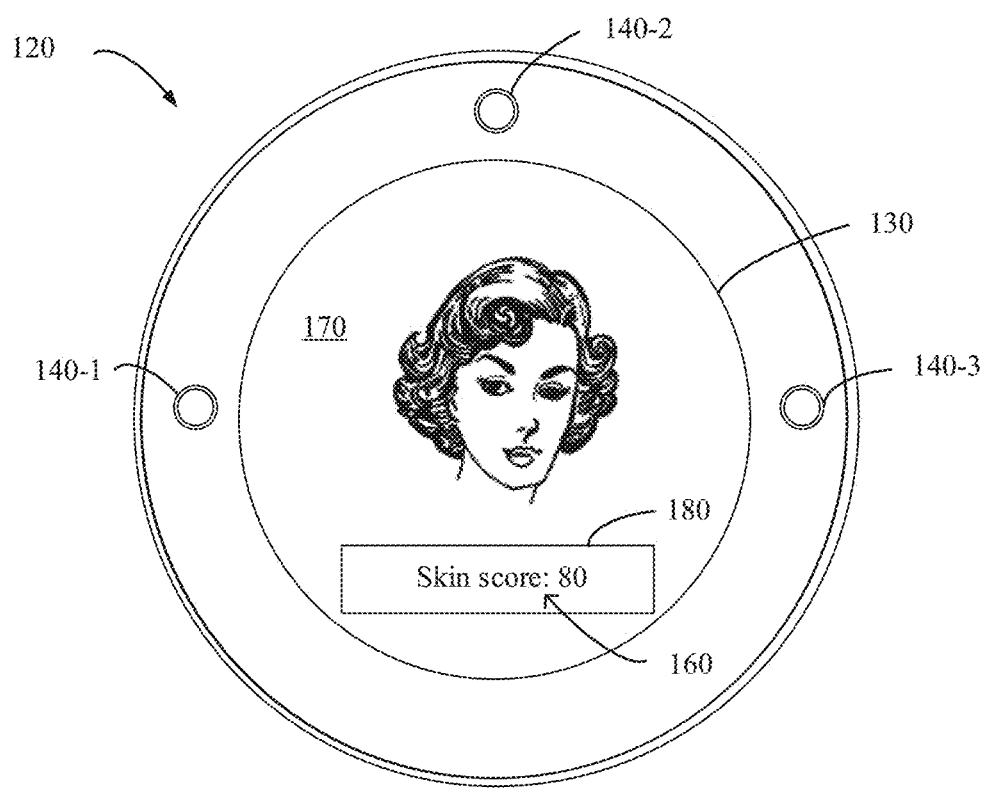
FIG. 1B shows an example electronic device according to an embodiment of the present disclosure.

In some other implementations, as shown in FIG. 1B, the presentation device 130 may include a mirror region 170 and an electronic display region 180. The electronic display region 180 may be integrated into the presentation device 130 in an appropriate manner. In some implementations, the electronic display region 180 may be designed to be separated from the mirror region 170, so that the mirror region 170 presents the image of the object 110 through specular reflection, and the electronic display region 180 may simultaneously display corresponding digital content, such as the appearance evaluation 160. Alternatively, the electronic display region 180 may be disposed on a back surface of the mirror region 170, so that the electronic display region 180 presents the corresponding digital content only when the electronic display region 180 is powered on for display. In this case, no specular reflection or relatively weak specular reflection occurs in a region that is in the mirror region 170 and that is corresponding to the electronic display region 180, so that the electronic display region 180 can more clearly present the digital content. When the electronic display region 180 is not powered on, the presentation device 130 is presented as a complete mirror region 170.

In such an arrangement manner, the mirror 170 may display the object 110 in real time through specular reflection, and the electronic display region 180 may present the appearance evaluation 160 of the object 110. In this manner, a size of the electronic display region 180 may be reduced, so that costs of the electronic device 120 are reduced, and energy consumption of the electronic device 120 is reduced.

In some implementations, the appearance evaluation 160 provided by the electronic device 120 may be, for example, an evaluation of skin of the object, and includes but is not limited to an overall skin evaluation, an evaluation of colored patches on the skin, a pore evaluation, a wrinkle evaluation, a red region evaluation, a colored patch evaluation, a pimple evaluation, a dark circle evaluation, a blackhead evaluation, and the like. Alternatively, the appearance evaluation may be an object-specific appearance score. For example, the appearance evaluation may be a "facial attractiveness" score for the face of the object. Alternatively, the appearance evaluation may include a "facial attractiveness" score for the five sense organs on the face of the object.

It should be understood that any other appropriate manner may also be provided to provide the appearance evaluation 160. For example, the electronic device 120 may play the appearance evaluation 160 in a voice manner, or the electronic device 120 may send the appearance evaluation 160 to the object 110 by using an email or a short message, or in another communication manner. A process of generating the appearance evaluation 160 is discussed in detail below, and is not described in detail herein.

In some implementations, the object 110 is a user who uses the electronic device 120 for appearance evaluation. When the user faces the electronic device 120, the electronic device 120 can collect photos of specific regions of the user by using the plurality of cameras 140. For example, when the appearance evaluation is an evaluation of face skin, the electronic device 120 may collect face photos of different angles of the user by using the cameras 140, and generate the appearance evaluation 160 by performing corresponding analysis on these photos.

In some other implementations, the object 110 may alternatively be another appropriate creature, for example, a pet such as a cat or a dog. When the pet is placed in front of the electronic device 120, the electronic device 120 may collect photos of different angles of the pet, and provide an appearance evaluation of the pet. It should be understood that a process of providing the appearance evaluation of the pet is similar to a process of providing the appearance evaluation of the user. For ease of description, the user is used as an example to describe a solution of the present disclosure.

It should be understood that arrangements such as a specific quantity of cameras, an installation position, and a shape of the electronic device in FIG. 1A and FIG. 1B are all examples, and are not intended to be a limitation on the present disclosure.

Variants of the Electronic Device

The environment 100 in which embodiments of the present disclosure can be implemented is described above with reference to FIG. 1A and FIG. 1B, and the example electronic device 120 is provided, The electronic device 120 in FIG. 1A and FIG. 1B is implemented as a form of a mirror. Other variants of the electronic device 120 are described below with reference to FIG. 2, FIG. 3A to FIG. 3C, and FIG. 4A to FIG. 4D.

Figure 2:
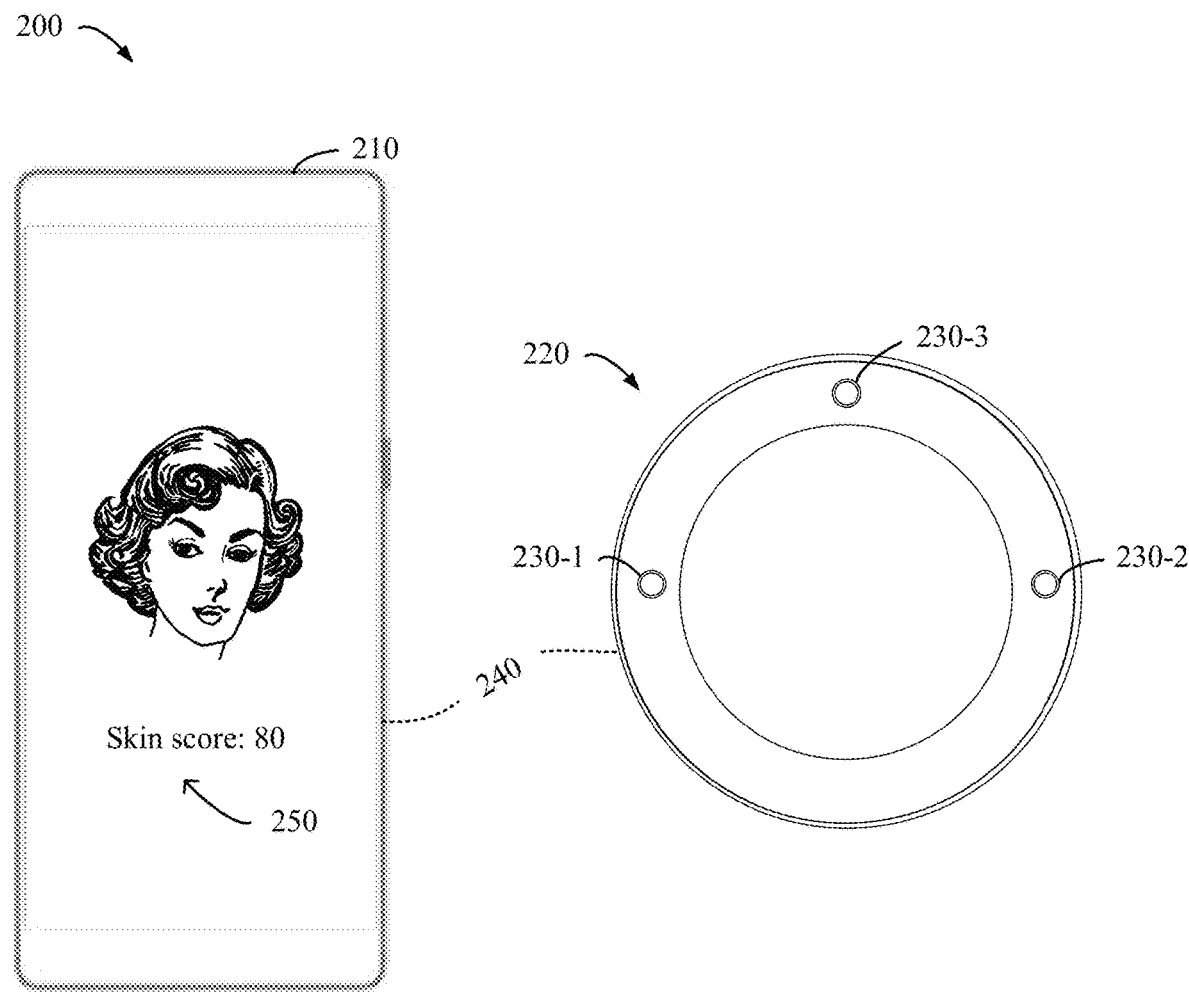
FIG. 2 is a schematic diagram of an example electronic device according to some embodiments of the present disclosure.

FIG. 2 shows an example electronic device 200 according to some other embodiments of the present disclosure. As shown in FIG. 2, the electronic device 200 includes a presentation device 210 and an image collection device 220 that are physically separated, and the image collection device 220 may include a plurality of cameras 230-1, 230-2, and 230-3 (individually or collectively referred to as a camera 230). In some implementations, the image collection device 220 is physically separated from the presentation device 210 and is connected to the presentation device 210 by using a wired or wireless connection 240. In a use process, the electronic device 200 may obtain an image of an object by using the image collection device 220, and may provide an appearance evaluation 250, for example, by using the presentation device 210.

In some implementations, a processing unit configured to control image collection and provide the appearance evaluation may be disposed in either of the presentation device 210 and the image collection device 220. For example, the processing unit may be disposed in the presentation device 210 (such as a terminal device with a processing capability), and the electronic device 200 may use the processing unit to send, to the image collection device 220, an instruction for collecting the image by using the camera 230. Then, the image collection device 220 may provide the collected image for the presentation device 210 by using a disposed communication component, analyze the collected image by using the processing unit to determine an appearance evaluation, and provide the appearance evaluation by using the presentation device 210. Alternatively, for example, the electronic device 200 may send the collected image to a remote computing device (such as a server) to obtain the appearance evaluation.

Alternatively, the processing unit may be disposed in the image collection device 220. The electronic device 200 may send an image collection instruction to the camera 230 by using the processing unit, analyze the collected image by using the processing unit to determine an appearance evaluation, and then provide, by using a communication component, the determined appearance evaluation for the presentation device 210, to present the image to a user.

In some implementations, the image collection device 220 may be arranged as a group of cameras 230 disposed at specific positions, For example, a group of cameras 230 may be integrated into a same housing to form an integrated image collection device 220. Alternatively, the image collection device 220 may be a general name of a group of separated cameras 230, and the group of separated. cameras 230 may communicate separately with the presentation device 210 and/or the processing unit, or uniformly with the presentation device 210 and/or the processing unit.

It should be understood that a quantity of cameras 230 and an arrangement manner of the cameras 230 shown in FIG. 2 are merely examples. The arrangement manner of the cameras 230 may be similar to that of the foregoing cameras 140 discussed with reference to FIG. 1, and is not repeatedly described herein again. The image collection device 220 is disposed as an independent device separated from the presentation device 210, so that in the solution of the present disclosure, for example, the image collection device 220 may be constructed as an accessory available to a mobile terminal. In this way, a calculation and presentation capability of an existing mobile terminal is fully used.

Figures 3A, 3B, 3C:
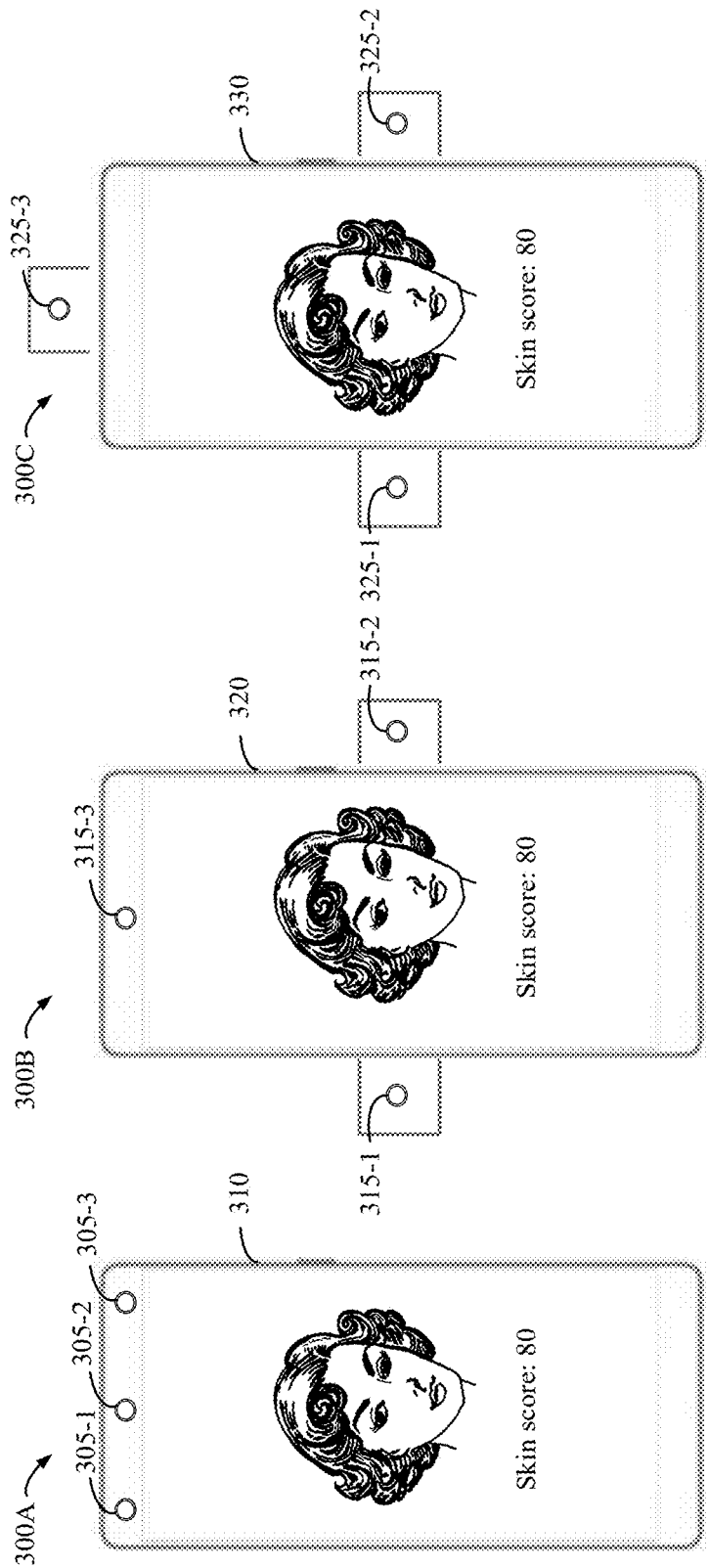
FIG. 3A to FIG. 3C are schematic diagrams of an example electronic device according to some other embodiments of the present disclosure.

FIG. 3A to FIG. 3C show example electronic devices according to some other embodiments of the present disclosure.

FIG. 3A shows an example electronic device 300A according to some other embodiments of the present disclosure. As shown in FIG. 3A. the electronic device 300A may be implemented as a mobile device 310 with a plurality of front-facing cameras 305-1, 305-2, and 305-3 (individually or collectively referred to as a front-facing camera 305). As shown in FIG. 3A, these front-facing cameras 305 are disposed with at least a predetermined distance from each other, so that different front-facing cameras 305 can collect images of different regions of an object. Further, the electronic device 310 may perform corresponding analysis by using the collected images to generate an appearance evaluation of the object. The electronic device 310 may further present the appearance evaluation by using a display screen.

In a use process, for example, a user may hold the mobile device 310, and run an application program installed on the mobile device 310. The application program can enable the mobile device 310 to send an instruction for collecting images of the user by using the plurality of front-facing cameras 305, and perform corresponding image analysis on the collected images to generate an appearance evaluation. Then, the application program may further present the generated appearance evaluation by using an image interface displayed on the display screen of the electronic device 320. In this manner, in the solution of the present disclosure, an appearance evaluation providing method in the present disclosure can be performed by an existing mobile device whose front-facing cameras meet distribution.

FIG. 3B shows an example electronic device 300B according to some other embodiments of the present disclosure. As shown in FIG. 3B, the electronic device 300B includes a mobile device 320 with a front-facing camera 315-3 and a camera 315-1 and a camera 315-2 that are attached to the mobile device 320. It should be understood that "attach" means that a camera independent of the mobile device is fastened to the mobile device in an appropriate manner (for example, removable or non-removable).

As shown in FIG. 3B, the camera 315-1 and the camera 315-2 may be symmetrically arranged on both sides of the mobile device 320 to more comprehensively collect an image of an object. In addition, the camera 315-1 and the camera 315-2 may be communicatively coupled to the mobile device 320 by using a wired or wireless connection, so that the mobile device 320 can obtain images collected by the camera 315-1 and the camera 315-2. Further, the electronic device 320 may perform corresponding analysis by using images collected by the camera 315-1 and the camera 315-2 that are communicatively coupled and the front-facing camera 315-3, to generate an appearance evaluation of the object. The electronic device 320 may further present the appearance evaluation by using a display screen.

In a use process, a user may fasten the camera 315-1 and the camera 315-2 that are used as independent accessories to the mobile device 320 of the user in a manner such as buckling, and establish a USB connection or a Bluetooth connection between the mobile device 320 and both the camera 315-1 and the camera 315-2. Further, for example, the user may hold the mobile device 320, and may run an application program installed on the mobile device 320. The application program can detect the front-facing camera 315-3 included in the mobile device 320 and the camera 315-1 and the camera 315-2 that are communicatively coupled to the mobile device 320. Further, the application program can enable the mobile device 320 to send an instruction for collecting images of the user by using the cameras 315-1, 315-2, and 315-3, and perform corresponding image analysis on the collected images to generate an appearance evaluation. Then, the application program may further present the generated appearance evaluation by using an image interface displayed on the display screen of the electronic device 320.

Considering that a large quantity of current mobile devices include front-facing cameras at intermediate positions, if additional cameras are provided as accessories, device portability can be improved in the solution of the present disclosure, so that the user can quickly and conveniently obtain the appearance evaluation.

FIG. 3C shows an example electronic device 300C according to some other embodiments of the present disclosure. As shown in FIG. 3C, the electronic device 300B includes a mobile device 330, and a camera 325-1, a camera 325-2, and a camera 325-3 (individually or collectively referred to as a camera 325) that are attached to the mobile device 330.

As shown in FIG. 3C, the camera 325-1 and the camera 325-2 may be symmetrically arranged on a left side and a right side of the mobile device 330, and the camera 315-3 may be arranged above the mobile device 330. In such an arrangement, the camera 325 can more comprehensively collect an image of an object. In addition, the camera 325 may be communicatively coupled to the mobile device 330 by using a wired or wireless connection, so that the mobile device 330 can obtain the image collected by the camera 325. Further, the electronic device 320 may perform corresponding analysis on the image collected by the communicatively coupled camera 325, to generate an appearance evaluation of the object. The electronic device 330 may further present the appearance evaluation by using a display screen.

In a use process, a user may fasten the cameras 325-1, 325-2, and 325-3 that are used as independent accessories to the mobile device 330 of the user in a manner such as buckling, and establish a USB connection or a Bluetooth connection between the mobile device 330 and the plurality of cameras 325. Further, for example, the user may hold the mobile device 330, and may run an application program installed on the mobile device 330. The application program can detect the plurality of cameras 325 that are communicatively coupled to the mobile device 330. Further, the application program can enable the mobile device 330 to send an instruction for collecting images of the user by using the cameras 325, and perform corresponding image analysis on the collected images to generate an appearance evaluation. Then, the application program may further present the generated appearance evaluation by using an image interface displayed on the display screen of the electronic device 330.

Because some mobile devices have no front-facing cameras or positions of front-facing cameras of the mobile devices are not ideal, the plurality of cameras used as independent accessories are provided, so that compatibility of the mobile device in the solution can be further improved in the solution of the present disclosure.

FIG. 4A to FIG. 4D show example electronic devices according to still some other embodiments of the present disclosure.

Figure 4A:
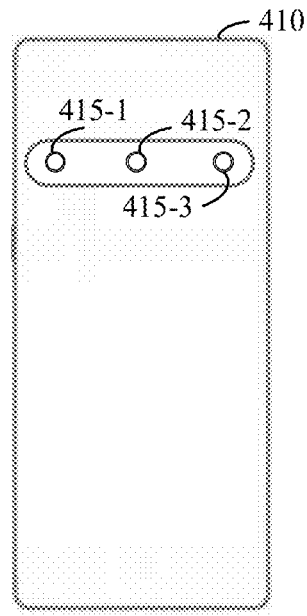
FIG. 4A to FIG. 4D are schematic diagrams of an example electronic device according to still some other embodiments of the present disclosure.
Figure 4B:

FIG. 4A shows an example electronic device 410 according to some other embodiments of the present disclosure. As shown in FIG. 4A, the electronic device 410 may be implemented as a mobile device with a plurality of rear-facing cameras 415-1, 415-2, and 415-3 (individually or collectively referred to as a rear-facing camera 415). As shown in FIG. 4A, these rear-facing cameras 415 are disposed with at least a predetermined distance from each other, so that different rear-facing cameras 415 can collect images of different regions of an object. Further, the electronic device 410 may perform corresponding analysis by using the collected images to generate an appearance evaluation of the object. After the evaluation is completed, as shown in FIG. 4B, the electronic device 410 may further present the appearance evaluation by using a front display screen 425 of the mobile device.

Figure 4C:
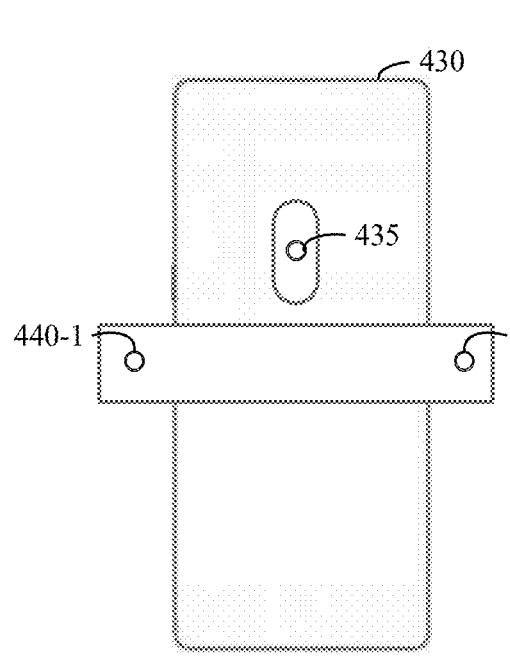

FIG. 4C shows an example electronic device 430 according to some other embodiments of the present disclosure. As shown in FIG. 4C, the electronic device 430 includes a mobile device with a rear-facing camera 435 and a camera 440-1 and a camera 440-2 that are attached to the mobile device.

As shown in FIG. 4C, the camera 440-1 and the camera 440-2 may be symmetrically arranged on both sides of the mobile device to more comprehensively collect an image of an object. In addition, the camera 440-1 and the camera 440-2 may be communicatively coupled to the mobile device by using a wired or wireless connection, so that the mobile device can obtain images collected by the camera 440-1 and the camera 440-2. Further, the electronic device 430 may perform corresponding analysis by using images collected by the cameras 440-1 and 440-2 that are communicatively coupled and the rear-facing camera 435, to generate an appearance evaluation of the object. The electronic device 430 may further present the appearance evaluation (not shown in the figure) by using a front display screen of the mobile device.

Figure 4D:
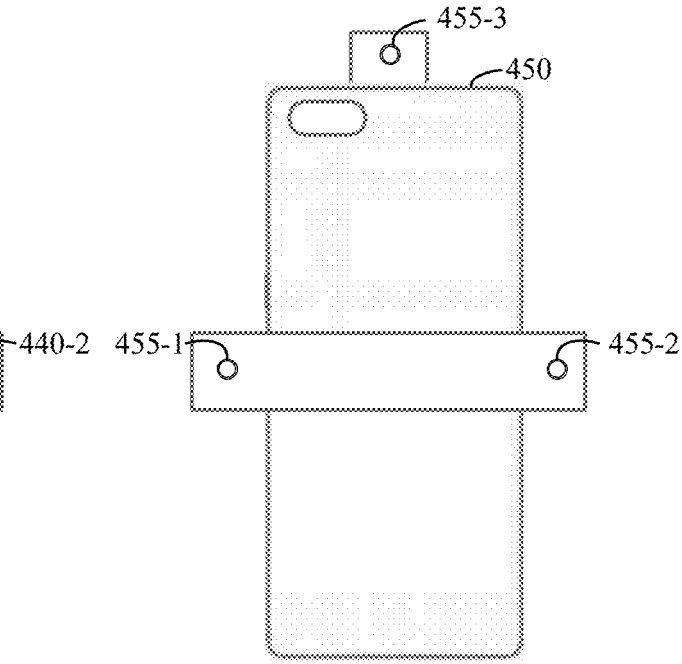

FIG. 4D shows an example electronic device 450 according to some other embodiments of the present disclosure. As shown in FIG. 4D, the electronic device 450 includes a mobile device, and a camera 455-1, a camera 455-2, and a camera 455-3 (individually or collectively referred to as a camera 455) that are attached to the mobile device.

As shown in FIG. 4D, the camera 455-1 and the camera 455-2 may be symmetrically arranged on a left side and a right side of the mobile device, and the camera 455-3 may be arranged above the mobile device. In such an arrangement, the camera 455 can more comprehensively collect an image of an object. In addition, the camera 455 may be communicatively coupled to the mobile device by using a wired or wireless connection, so that the mobile device can obtain the image collected by the camera 455. Further, the mobile device may perform corresponding analysis on the image collected by the communicatively coupled camera 455, to generate an appearance evaluation of the object. The electronic device 455 may further present the appearance evaluation by using a front display screen of the mobile device.

In consideration of a fact that in a current market, compared with a front-facing camera, a rear-facing camera can obtain an image with higher resolution, when the rear-facing camera is used, accuracy of the appearance evaluation can be further improved in the solution of the present disclosure. In a use process, a to-be-evaluated user may hold the mobile device. In addition, because a display screen is located on a back surface of the camera, based on such an arrangement, in the solution of the present disclosure, another user can be further enabled to conveniently hold the mobile device to collect an image of the to-be-evaluated user.

Several variants of the electronic device in the present disclosure are described above, It should be understood that another appropriate electronic device may also be used without violating the spirit of the present disclosure.

Generation of an Appearance Evaluation

A process of generating an appearance evaluation of an object is described below with reference to FIG. 5 and FIG. 6A to FIG. 6F. The following process may be implemented by any electronic device described with reference to FIG. 1 to FIG. 4, For ease of description only, the environment 100 shown in FIG. 1 is used as an example below to describe a specific process of generating the appearance evaluation.

In some implementations, before controlling the camera 140 to capture a corresponding image, the electronic device 120 may determine whether a position or a posture of the object 110 meets an image collection condition of the camera 140. For example, the image collection condition may be an angle range or a distance range of the object 110 relative to the camera 140.

The electronic device 120 may determine whether an angle or a distance between the object 110 and each camera 140 meets a preset image collection condition, and provide a prompt for adjusting the position or the posture for the object 110 when determining that the image collection condition is not met. For example, after image collection starts, if it is determined that the object 110 is excessively far away from the camera 140, the electronic device 120 may indicate, by using voice, the object 110 to adjust the position. For example, the electronic device 120 may indicate, by using voice, the user to "Please come closer". Alternatively, for example, when a face of the object 110 faces the camera 140-1 on one side to an excessive extent, the electronic device 120 may further indicate, by using a corresponding visual effect on the presentation device 130, the object 110 to adjust the posture. For example, the electronic device 120 may present a virtual character in a display region of the presentation device 130, and indicate, by using an animation of the virtual character, the object 110 to adjust a face orientation to a specific direction. Additionally, for example, the electronic device 120 may further provide a voice prompt while presenting the animation, so that the object 110 can be more aware of how to adjust the posture or the position.

In some implementations, if it is determined that the position or the posture of the object 110 meets the image collection condition of the camera 140, the electronic device 120 may further indicate the object 110 to keep the position or the posture of the object 110. For example, the electronic device 120 may indicate, by using voice, the object to keep the position or the posture for image collection. Alternatively or additionally, when determining that the image collection condition is met, the electronic device 120 may se a tinier to start to collect an image after predetermined time. For example, the electronic device 120 may indicate, by using voice information, the user to keep the posture and indicate the object 110 to start to collect an image in three seconds.

In some implementations, to improve quality of the collected image, before controlling the camera 140 to capture a corresponding image, the electronic device 120 may further adjust focal lengths of one or more cameras 140 based on a feature of the object 110. For example, a collected face image of the object 110 is used as an example. Because a face of each person may have a different radian, a focal length of an image of better quality that can be obtained by the camera is also different. For example, the electronic device 120 may dynamically adjust the focal length of the camera 140 based on a radian of the face of the object 110, so that a photographed image is clearer. It should be understood that the focal length may be adjusted by using any appropriate dynamic focusing technology in the art. Specific details are not described herein.

In addition, the face image of the object 110 is collected as an example. Because the face has a specific radian, when a position of the camera is fixed, different photographing angles also cause a quality difference of collected images. To obtain an image of higher quality, in some implementations, orientations one or more cameras in the camera 140 may be arranged differently.

Figure 5:
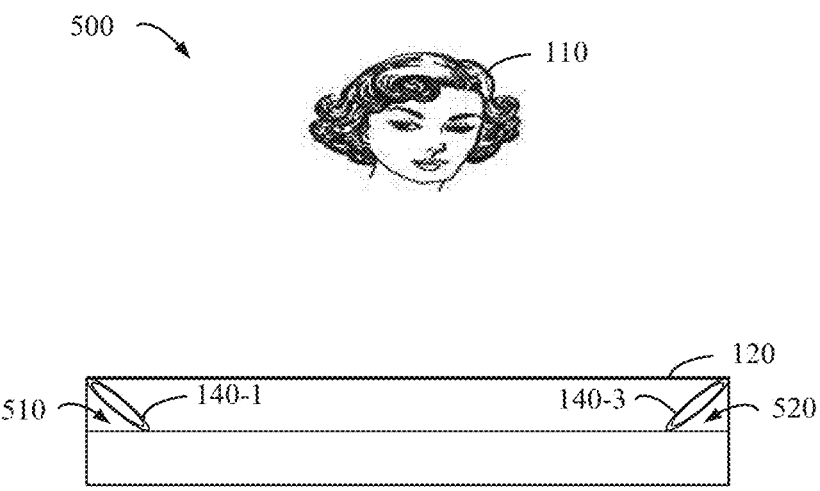
FIG. 5 is a schematic diagram of arrangement of cameras according to some embodiments of the present disclosure.

For example, FIG. 5 is a schematic diagram 500 of arrangement of cameras according to some embodiments of the present disclosure. As shown in FIG. 5, the camera 140-1 is disposed to have an angle 510 with a surface of the electronic device 120, so that a right-face image of the object 110 can be better captured, and the camera 140-2 is disposed to have an angle 520 with the surface of the electronic device 120, so that a left-face image of the object 110 can be better captured. In some implementations, the angle 510 may be the same as the angle 520 when the camera 140-1 and the camera 140-2 are symmetrically arranged with respect to the electronic device 120. For example, the angle 510 and the angle 520 may be any angle in a range from 10° to 30°.

In some implementations, considering that face radians of different objects may be relatively different, a preset angle may not be applicable to some objects. In some implementations, the camera 140 may further dynamically adjust a photographing angle relative to the electronic device 120. For example, the electronic device 120 may adjust photographing angles of the one or more cameras 140 based on the feature of the object 110. For example, the example in FIG. 5 is still used. The electronic device 120 may adjust, for example, the photographing angle 510 of the camera 140-1 based on a radian of a right face of the object 110, and adjust the photographing angle 520 of the camera 140-3 based on a radian of a left face of the object 110, so that a photographed image is clearer. It should be understood that an angle of the camera may be adjusted by using any appropriate drive structure. This is not intended to be limited in the present disclosure.

Figures 6A, 6B, 6C:
FIG. 6A to FIG. 6F are schematic diagrams of a process of determining an appearance evaluation according to some embodiments of the present disclosure.

In some implementations, when it is determined that the position or the posture of the object meets the image collection condition, and after the electronic device adjusts an orientation of the camera based on the feature of the object, the electronic device may send an instruction, so that the camera collects the image of the object. FIG. 6A, FIG. 6B, and FIG. 6C separately show different images of the object that are collected by different cameras. An image 610 (referred to as a first image for ease of description) may be a left-cheek image of the object 110 that is captured by the camera 140-1, an image 630 (referred to as a second image for ease of description) may be a right-cheek image captured by the camera 140-3, and an image 620 (referred to as a third image for ease of description) may be a front-face image captured by the camera 140-2.

After obtaining a plurality of images photographed by different cameras, the electronic device 120 may perform appearance analysis by using the plurality of obtained images. Specifically, the electronic device 120 may first determine corresponding regions of interest in the plurality of images based on a type of an appearance evaluation that needs to be provided. In some implementations, the electronic device 120 may pre-establish an association relationship between a type of an appearance evaluation, a camera position, and a corresponding region of interest. For example, the electronic device 120 may pre-store mapping between "facial pore status evaluation", "camera 140-1", and a corresponding region of interest.

In some implementations, the region of interest may be represented as a region surrounded by a plurality of feature points. The electronic device 120 may indicate a corresponding region of interest by storing descriptions of these feature points. Such descriptions of the feature point can enable the electronic device 120 to identify an image position corresponding to the feature point from a corresponding image.

FIG. 6A is used as an example. When the appearance evaluation that needs to be provided is, for example, an evaluation of a "facial pore status", the electronic device 120 may determine, based on the pre-stored mapping, a plurality of feature point descriptions corresponding to the "facial pore status" and the camera 140-1, and detect a corresponding feature point 605 from a collected image by using a feature point identification technology. Then, the electronic device 120 may determine a corresponding region of interest 615 (referred to as a first region of interest for ease of description) from the first image 610 based on a plurality of detected feature points 605. Based on a similar manner, the electronic device 120 may determine a corresponding region of interest 635 (referred to as a second region of interest for ease of description) from the second image 630, and determine a corresponding region of interest 625 (referred to as a third region of interest for ease of description) from the third image 620. In the example in FIG. 6A, the first region of interest 615, the second region of interest 635, and the third region of interest 625 each represent a group of appearance features (in this example, a pore feature) corresponding to a different part of the object.

The appearance feature discussed in this specification may include but is not limited to a colored patch feature of the skin, a wrinkle feature, a red region feature, a colored patch feature, a pimple feature, a dark circle feature, a blackhead feature, and the like. When a different appearance feature is analyzed, a region of interest corresponding to the appearance feature in different images also changes accordingly. For example, a region of interest corresponding to blackhead mainly includes a nose part of the object.

Then, the electronic device 120 may determine a final appearance evaluation based on the first region of interest 615, the second region of interest 635, and the third region of interest 625. For example, the electronic device 120 may separately perform corresponding image analysis on the first region of interest 615, the second region of interest 635, and the third region of interest 625, to obtain regional appearance evaluation results corresponding to different regions of interest. Then, the electronic device 120 may provide a total appearance evaluation by combining a plurality of regional appearance evaluation results.

In some implementations, because images collected by different cameras may overlap, when fusing the plurality of regional appearance evaluation results, the computing device 120 further needs to consider whether the plurality of regions of interest overlap, to avoid an inaccurate result due to repeated calculation.

Figures 6D, 6E, 6F:
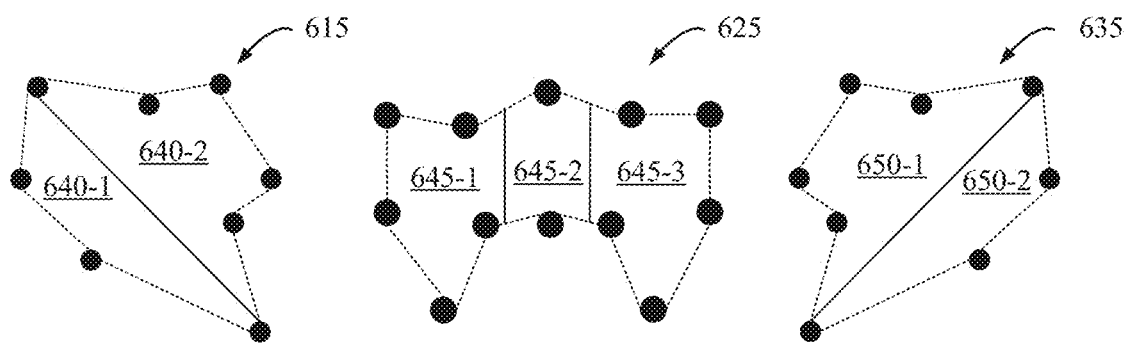

For example, a correspondence between different regions of interest may be pre-stored in the electronic device 120. For example, as shown in FIG. 6D, FIG. 6E, and FIG. 6F, the correspondence may be pre-stored to indicate the following: A region 640-1 in the first region of interest 615 is a non-overlapping region, and a region 640-2 is a region that overlaps a region 645-1 in the third region of interest 625; a region 650-2 in the second region of interest 635 is a non-overlapping area, and a region 650-1 is a region that overlaps a region 645-3 in the third region of interest 625 and a region 645-2 in the third region of interest 625 is a non-overlapping region. It should be understood that such a region correspondence may be stored in any appropriate manner. For example, the region correspondence may be maintained by storing feature points of an overlapping region in different regions of interest.

The "facial pore status" is used as an example. The electronic device 120 may use different policies to process the overlapping region and the non-overlapping region. For example, when the "facial pore status" is embodied by a quantity of pores on the face, the electronic device 120 may first determine quantities of pores in the region 640-1, the region 640-2, the region 650-1, the region 650-2, the region 645-1, the region 645-2, and the region 645-3 through image processing. Then, when fusing evaluations of the plurality of regions of interest, the electronic device 120 may determine, for example, an average value (referred to as a first average value for ease of description) of a quantity of pores in the region 640-2 that is determined based on the first image 610 and a quantity of pores in the region 645-1 that is determined based on the third image 620, determine an average value (referred to as the first average value for ease of description) of a quantity of pores in the region 650-1 that is determined based on the second image 630 and a quantity of pores in the region 645-3 that is determined based on the third image 620, and determine, as a total quantity of pores of the object 110, a sum of the quantity of pores determined based on the region 640-1, the first average value, the quantity of pores determined based on the region 645-2, the second average value, and the quantity of pores determined based on the region 650-2. For example, the total quantity of pores may be represented as:

$$\text{Total quantity of pores} = R1 + L1 + F1 + (R0 + FR)/2 + (L0 + FL)/2 \quad (1)$$

R1 represents the quantity of pores in the region 610-1, L1 represents the quantity of pores in the region 650-2, F1 represents the quantity of pores in the region 645-2, R0 represents the quantity of pores in the region 640-2, FR represents the quantity of pores in the region 645-1, L0 represents the quantity of pores in the region 650-1, and FL represents the quantity of pores in the region 645-3. In this manner, the electronic device 120 can accurately determine a quantity of pores on the entire face of the object 110, so that accuracy of appearance analysis is improved.

It should be understood that the "quantity of pores on the face" may be a piece of data used to determine an evaluation of the "facial pore status". When determining the evaluation of the "facial pore status", the electronic device 120 may also use a similar method to determine other data such as "pore area ratio", "pore size", and "pore color", and determine a final "facial pore status" based on the data.

A process of determining the appearance evaluation in which regions of interest overlap is described above. In some examples, the overlapping region may not be involved during determining of some appearance evaluations. For example, during determining of an evaluation of crow's feet of the user, a final evaluation of the crow's feet may be directly determined based on evaluation results corresponding to a left-eye image and a right-eye image that are separately collected by different cameras.

Examples of a skin evaluation applicable to the present disclosure may further include: a colored patch evaluation of the skin, a wrinkle evaluation, a red region evaluation, a colored patch evaluation, a pimple evaluation, a dark circle evaluation, a blackhead evaluation, another skin evaluation that may be determined by using image analysis, or a combination of any one of the foregoing. It should be understood that the evaluations may be determined in the manner discussed above, and details are not described herein again.

In some implementations, the electronic device 120 may further determine, in the manner discussed above, appearance scores (such as facial attractiveness scores) corresponding to different regions, and determine a final appearance score by using the fusion method based on the overlapping region. This is not described in detail herein.

It should be understood that although the process of generating the appearance evaluation by using the images collected by the three cameras is described above as an example, in the present disclosure, any quantity of a plurality of images (such as two images or more than three images) may be analyzed in a similar manner, and appearance evaluations determined based on the images may be fused to determine a total appearance evaluation of the object.

Provision of an Appearance Evaluation

As discussed with reference to FIG. 1, the electronic device 120 may provide the appearance evaluation 160 by using the presentation device 130. In some implementations, the electronic device 120 may present the appearance evaluation 160 by using the presentation device 130 through the graphical interface 150.

Alternatively, the electronic device 120 may provide the appearance evaluation in another media form. For example, the electronic device 120 may send the appearance evaluation to a mailbox of the object 110 by using an email or a short message, or in another communication manner.

Figure 7:
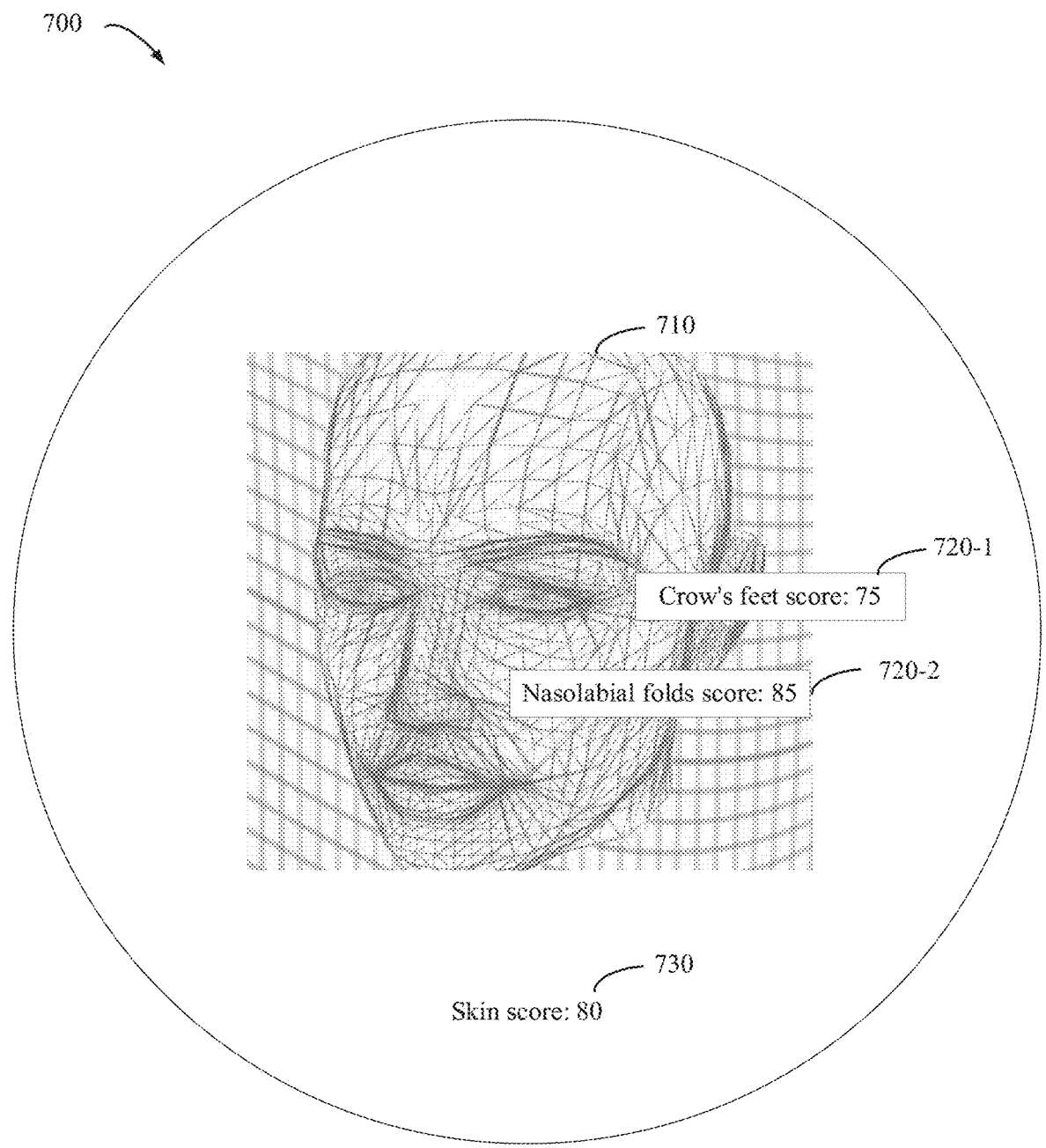
FIG. 7 shows an example graphical interface according to some embodiments of the present disclosure.

In some implementations, to enable the object 110 to more intuitively view the appearance evaluation 160, the electronic device 120 may further generate a three-dimensional model of the object 110 based on a plurality of images collected by cameras, and simultaneously display the three-dimensional model and the appearance evaluation by using the presentation device 130. FIG. 7 shows an example graphical interface 700 according to some embodiments of the present disclosure. As shown in FIG. 7, the graphical interface 700 includes a three-dimensional model 710 and a plurality of appearance evaluations 720-1, 720-2, and 730. It should be understood that the three-dimensional model 710 shown in FIG. 7 is merely an example, and the presented three-dimensional model 710 can accurately present skin images of different regions of an object.

In some implementations, for example, a user may also control display of the graphical interface 700 by performing a specific operation. For example, the user may change a presentation angle of the three-dimensional model 710 by using a slide or drag operation on a touchscreen, so that the user can check skin conditions of different regions.

In some implementations, an overall appearance evaluation 730 "Skin score: 80" of the skin is displayed in a region outside the three-dimensional image 710. In addition, to make it convenient for the object 110 to more intuitively check a skin region corresponding to each evaluation, the electronic device 120 may further present corresponding appearance evaluations at different positions of the three-dimensional model 710. For example, the electronic device 120 may present, at the tail of the eyes of the three-dimensional model, an appearance evaluation 720-1 "Crow's feet score: 75" corresponding to a "crow's feet evaluation", and present, near the nasolabial folds, an appearance evaluation 720-2 "Nasolabial folds score: 85" corresponding to a "nasolabial folds evaluation". For example, the electronic device 120 may also map the appearance evaluation as texture at a corresponding position of the three-dimensional model 710, so that the object 110 can more intuitively check the appearance evaluation.

Example Process

Figure 8:
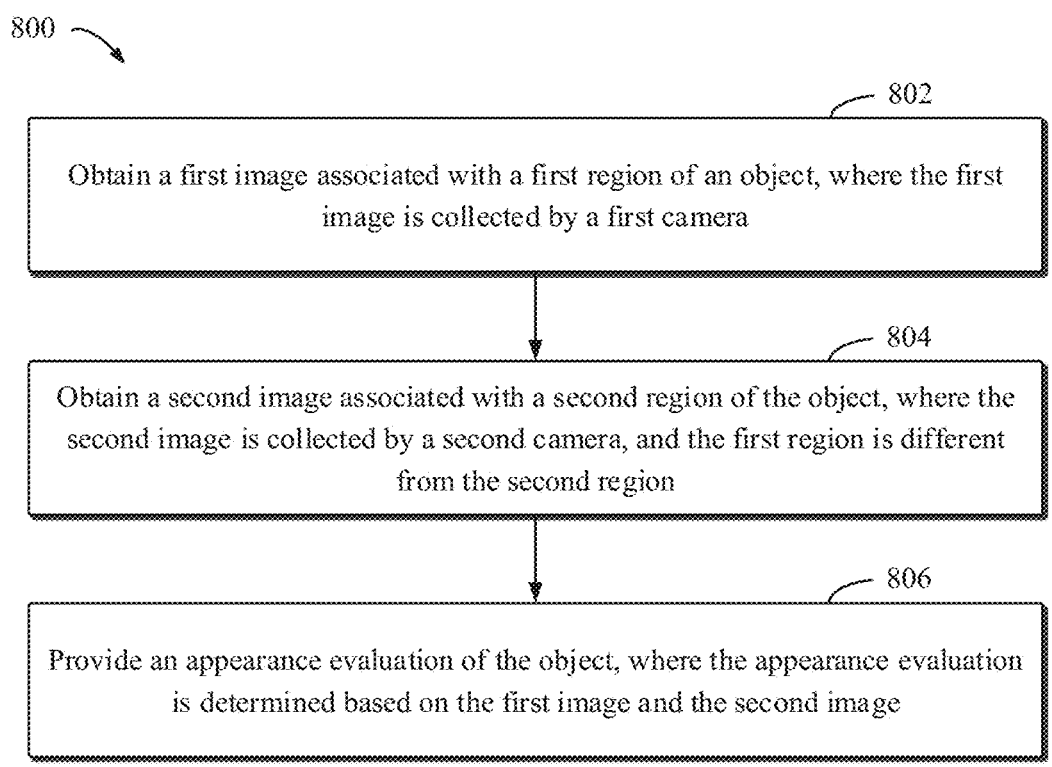
FIG. 8 is a flowchart of an example process of evaluating appearance of an object according to some embodiments of the present disclosure.

FIG. 8 is a flowchart of an example appearance analysis process 800 according, to an embodiment of the present disclosure. For example, the process 800 may be implemented by any electronic device described with reference to FIG. 1 to FIG. 4.

In a block 802, the electronic device obtains a first image associated with a first region of an object, and the first image is collected by a first camera. In a block 804, the electronic device obtains a second image associated with a second region of the object, the second image is collected by a second camera, and the first region is different from the second region. In a block 806, the electronic device provides an appearance evaluation of the object, and the appearance evaluation is determined based on the first image and the second image.

Figure 9:
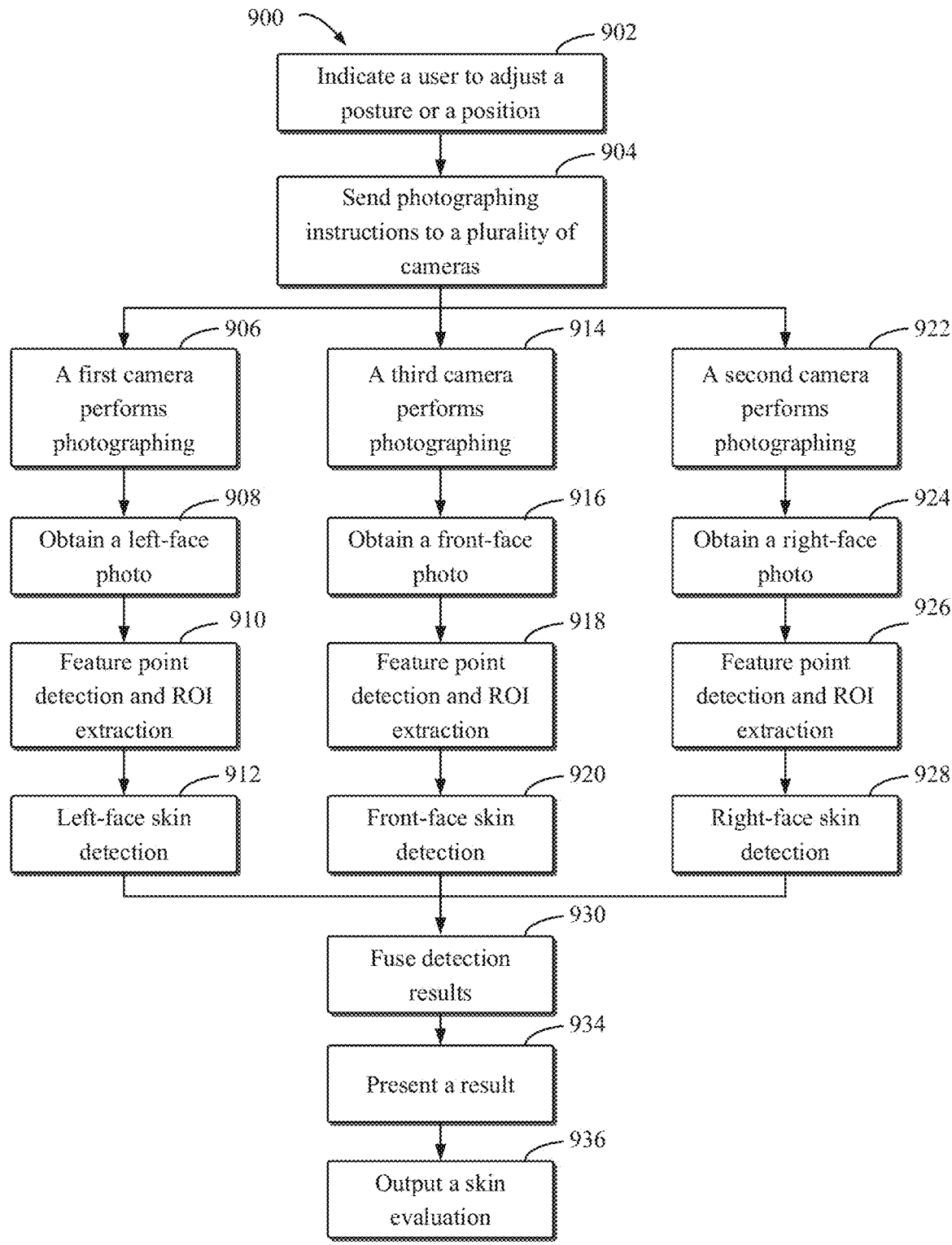
FIG. 9 is a flowchart of an example process of evaluating skin of a human face according to some embodiments of the present disclosure.

FIG. 9 is a flowchart of another example appearance analysis process 900 according to an embodiment of the present disclosure. For example, the process 900 may be implemented by any electronic device described with reference to FIG. 1 to FIG. 4.

As shown in FIG. 9, in a block 902, when a posture or a position of a user does not meet an image collection condition, the electronic device may indicate the user to adjust the posture or the position. In 904, when it is determined that the posture and/or the position of the user meet/meets the image collection condition, the electronic device may send a photographing instruction to a plurality of cameras. In blocks 906, 914, and 922, a first camera, a third camera, and a second camera each perform a photographing action. Accordingly, in blocks 908, 916, and 924, the electronic device may obtain a left-face image, a front-face image, and a right-face image that are respectively collected by the first camera, the third camera, and the second camera.

In blocks 910, 918, and 926, the electronic device may separately perform feature point detection and ROI extraction on the left-face image, the front-face image, and the right-face image based on a type of skin detection to be performed. In blocks 912, 920, and 928, the electronic device may separately perform skin detection on an extracted left-face ROI, an extracted front-face ROI, and an extracted right-face ROI to obtain a left-face skin detection result, a front-face skin detection result, and a right-face skin detection result.

In a block 930, the electronic device may fuse the left-face skin detection result, the front-face skin detection result, and the right-face skin detection result with reference to the foregoing described result fusion method, to determine a final skin detection result of the user. In a block 934, the electronic device may present the skin detection result by using a screen. In 936, the electronic device may further output a skin evaluation in a manner such as a short message or an email and by printing a written report.

Example Appearance Analysis Apparatus

Figure 10:
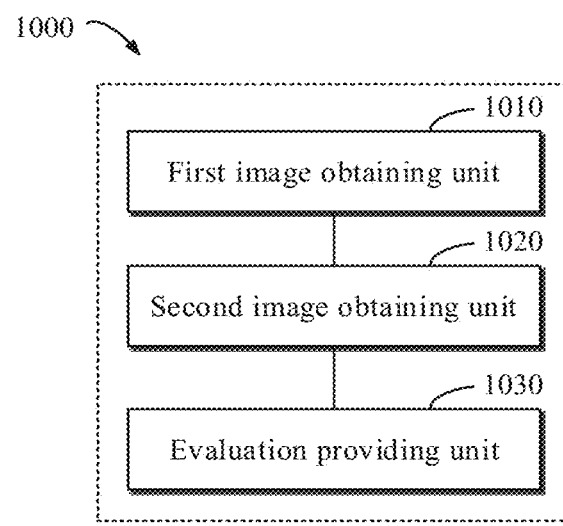
FIG. 10 is a schematic block diagram of an appearance analysis apparatus according to an embodiment of this application.

FIG. 10 shows an example appearance analysis apparatus 1000 according to an embodiment of the present disclosure. The example appearance analysis apparatus 1000 may be implemented as one or more software engines, hardware components, a combination thereof, and the like, and is configured with logic for implementing functions of corresponding modules.

As shown in FIG. 10, the appearance analysis apparatus 1000 may include a first image obtaining unit 1010, a second image obtaining unit 1020, and an evaluation providing unit 1030. Specifically, the first image obtaining unit 1010 is configured to obtain a first image associated with a first region of an object, and the first image is collected by a first camera. The second image obtaining unit 1020 is configured to obtain a second image associated with a second region of the object, the second image is collected by a second camera, and the first region is different from the second region. The evaluation providing unit 1030 is configured to provide an appearance evaluation of the object, and the appearance evaluation is determined based on the first image and the second image.

In some implementations, the appearance analysis apparatus 1000 further includes an object prompting unit, configured to: if a position or a posture of the object does not meet an image collection condition of the first camera or the second camera, indicate, by an electronic device, the object to adjust the position or the posture.

In some implementations, the appearance analysis apparatus 1000 further includes an camera adjustment unit, configured to: adjust, by the electronic device, a collection parameter of at least one of the first camera and the second camera based on a feature of the object, where the collection parameter includes at least one of a photographing angle and a focal length.

In some implementations, the first camera and the second camera are symmetrically arranged on opposite sides of an image collection device.

In some implementations, the electronic device further includes a third camera, and the appearance analysis apparatus 1000 further includes a third image obtaining unit, configured to: obtain a third image associated with a third region of the object, where the third image is collected by the third camera, the third camera is disposed on the image collection device, and a distance between the third camera and the first camera and a distance between the third camera and the second camera are the same.

In some implementations, the appearance analysis apparatus 1000 further includes an evaluation determining unit, configured to: determine a first region of interest from the first image, where the first region of interest represents a first group of appearance features of the object; determine a second region of interest from the second image, where the second region of interest represents a second group of appearance features of the object; and determine the appearance evaluation of the appearance feature of the object based on at least the first region of interest and the second region of interest.

In some implementations, the evaluation determining unit is further configured to: if the first region of interest and the second region of interest include an overlapping region, determine, based on the first region of interest, a first appearance evaluation corresponding to the overlapping region; determine, based on the second region of interest, a second appearance evaluation corresponding to the overlapping region; and determine the appearance evaluation of the appearance feature of the object based on the first appearance evaluation and the second appearance evaluation.

In some implementations, the evaluation providing unit 1030 is further configured to: present a three-dimensional model of the object, where the three-dimensional model is generated based on at least the first image and the second image; and present corresponding content in the appearance evaluation at different positions of the three-dimensional model.

In some implementations, the appearance evaluation includes al least one of a skin evaluation and an appearance score.

Example Device

Figure 11:
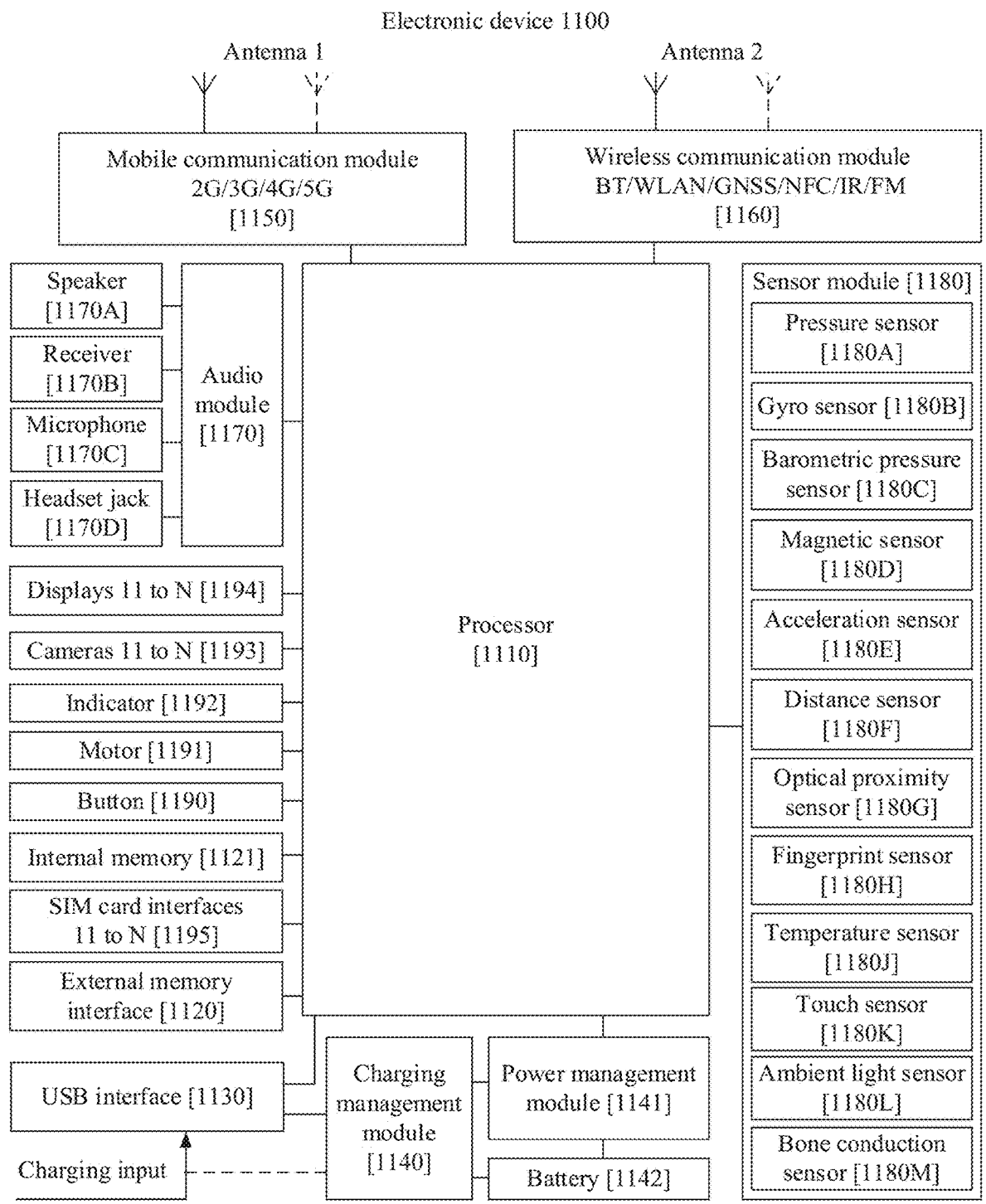
FIG. 11 is a schematic diagram of a structure of an electronic device according to an embodiment of this application.

FIG. 11 is a schematic diagram of a structure am electronic device 1100 according to an embodiment of this application. The electronic device 1100 may be any electronic device discussed above with reference to FIG. 1 to FIG. 4.

The electronic device 1100 may include a processor 1110, an external memory interface 1120, an internal memory 1121, a universal serial bus (universal serial bus, USB) interface 1130, a charging management module 1140, a power management module 1141, a battery 1142, an antenna 1, an antenna 2, a mobile communication module 1150, a wireless communication module 1160, an audio module 1170, a speaker 1170A, a receiver 1170B, a microphone 1170C, a headset jack 1170D, a sensor module 1180, a button 1190, a motor 1191, an indicator 1192 a camera 1193, a display 1194, a subscriber identity module (subscriber identity module, SIM) card interface 1195, and the like. The sensor module 1180 may include a pressure sensor 1180A, a gyro sensor 1180B, a barometric pressure sensor 1180C, a magnetic sensor 1180D, an acceleration sensor 1180E, a distance sensor 1180F, an optical proximity sensor 1180G, a fingerprint sensor 1180H, a temperature sensor 1180J, a touch sensor 1180K, an ambient light sensor 1180L, a bone conduction sensor 1180M, and the like.

It may be understood that the structure shown in this embodiment of the present invention does not constitute a specific limitation on the electronic device 1100. In some other embodiments of this application, the electronic device 1100 may include more or fewer components than those shown in the figure, or some components may be combined, or some components may be split, or there may be a different component layout. The components shown in the figure may be implemented by hardware, software, or a combination of software and hardware.

The processor 1110 may include one or more processing units. For example, the processor 1110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 1100. The controller may generate an operation control signal based on an instruction operation code and a time sequence signal, to complete control of instruction fetching and instruction execution.

A memory may be further disposed in the processor 1110, and is configured to store instructions and data. In some embodiments, the memory in the processor 1110 is a cache. The memory may store instructions or data just used or cyclically used by the processor 1110. If the processor 1110 needs to use the instructions or the data again, the processor may directly invoke the instructions or the data from the memory. This avoids repeated access and reduces a waiting time of the processor 1110, thereby improving system efficiency.

In some embodiments, the processor 1110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 1110 may include a plurality of groups of I2C buses. The processor 1110 may be separately coupled to the touch sensor 1180K, a charger, a flash, the camera 1193, and the like through different I2C bus interfaces. For example, the processor 1110 may be coupled to the touch sensor 1180K through the I2C interface, so that the processor 1110 communicates with the touch sensor 1180K through the I2C bus interface, to implement a touch function of the electronic device 1100.

The I2S interface may be configured to perform audio communication. In some embodiments, the processor 1110 may include a plurality of groups of I2S buses. The processor 1110 may be coupled to the audio module 1170 through the I2S bus, to implement communication between the processor 1110 and the audio module 1170. In some embodiments, the audio module 1170 may transmit an audio signal to the wireless communication module 1160 through the I2S interface, to implement a function of answering a call through a Bluetooth headset.

The PCM interface may also be configured to perform audio communication, and sample, quantize, and encode an analog signal. In some embodiments, the audio module 1170 may be coupled to the wireless communication module 1160 through a PCM bus interface. In some embodiments, the audio module 1170 may alternatively transmit an audio signal to the wireless communication module 1160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 1110 to the wireless communication module 1160. For example, the processor 1110 communicates with a Bluetooth module in the wireless communication module 1160 through the UART interface, to implement a Bluetooth function. in some embodiments, the audio module 1170 may transmit an audio signal to the wireless communication module 1160 through the UART interface, to implement a function of playing music through a Bluetooth headset.

The MIPI interface may be configured to connect the processor 1110 to a peripheral component, for example, the display 1194 or the camera 1193. The MIPI interface includes a camera serial interface (camera serial interface, CSI), a display serial interface (display serial interface, DSI), and the like. In some embodiments, the processor 1110 communicates with the camera 1193 through the CSI, to implement a photographing function of the electronic device 1100. The processor 1110 communicates with the display 1194 through the DSI, to implement a display function of the electronic device 1100.

The GPIO interface may be configured by using software. The GPIO interface may be configured as a control signal, or may be configured as a data signal. In some embodiments, the GPIO interface may be configured to connect the processor 1110 to the camera 1193, the display 1194, the wireless communication module 1160, the audio module 1170, the sensor module 1180, or the like. The GPIO interface may be alternatively configured as an I2C interface, an I2S interface, a UART interface, an MIPI interface, or the like.

The USB interface 1130 is an interface that conforms to a USB standard specification, and may be specifically a mini USB interface, a micro USB interface, a USB type-C interface, or the like. The USB interface 1130 may be configured to connect to a charger to charge the electronic device 1100, or may be configured to transmit data between the electronic device 1100 and a peripheral device, or may be configured to connect to a headset, to play audio through the headset. The interface may be alternatively configured to connect to another electronic device, for example, an AR device.

It may be understood that an interface connection relationship between the modules that is shown in this embodiment of the present invention is merely an example for description, and does not constitute a limitation on the structure of the electronic device 1100. In some other embodiments of this application, the electronic device 1100 may alternatively use an interface connection manner different from that in the foregoing embodiment, or use a combination of a plurality of interface connection manners.

The charging management module 1140 is configured to receive a charging input from a charger. The charger may be a wireless charger or a wired charger. In some embodiments of wired charging, the charging management module 1140 may receive a charging input from a wired charger through the USB interface 1130. In some embodiments of wireless charging, the charging management module 1140 may receive a wireless charging input through a wireless charging coil of the electronic device 1100, When charging the battery 1142, the charging management module 1140 may further supply power to the electronic device by using the power management module 1141.

The power management module 1141 is configured to connect the battery 1142 and the charging management module 1140 to the processor 1110. The power management module 1141 receives an input from the battery 1142 and/or the charging management module 1140, to supply power to the processor 1110, the internal memory 1121, an external memory, the display 1194, the camera 1193, the wireless communication module 1160, and the like. The power management module 1141 may be further configured to monitor parameters such as a battery capacity, a battery cycle count, and a battery health status (for example, leakage or impedance). In some other embodiments, the power management module 1141 may be alternatively disposed in the processor 1110. In some other embodiments, the power management module 1141 and the charging management module 1140 may be alternatively disposed in a same component.

A wireless communication function of the electronic device 1100 may be implemented by using the antenna 1, the antenna 2, the mobile communication module 1150, the wireless communication module 1160, the modem processor, the baseband processor, and the like.

The antenna 1 and the antenna 2 are configured to transmit and receive an electromagnetic wave signal. Each antenna in the electronic device 1100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 1150 may provide a solution that is applied to the electronic device 1100 and that includes wireless communication such as 2G, 3G, 4G, and 5G. The mobile communication module 1150 may include at least one filter, a switch, a power amplifier, a low noise amplifier (low noise amplifier, LNA), and the like. The mobile communication module 1150 may receive an electromagnetic wave through the antenna 1, perform processing such as filtering and amplification on the received electromagnetic wave, and transmit a processed electromagnetic wave to the modem processor for demodulation. The mobile communication module 1150 may further amplify a signal modulated by the modem processor, and convert an amplified signal into an electromagnetic wave for radiation through the antenna 1. In some embodiments, at least some function modules of the mobile communication module 1150 may be disposed in the processor 1110. In some embodiments, at least some function modules of the mobile communication module 1150 may be disposed in a same device as at least some modules of the processor 1110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transferred to the application processor. The application processor outputs a sound signal by using an audio device (which is not limited to the speaker 1170A, the receiver 1170B, or the like), or displays an image or a video through the display 1194. In some embodiments, the modem processor may be an independent component. In some other embodiments, the modem processor may be independent of the processor 1110, and is disposed in a same component as the mobile communication module 1150 or another function module.

The wireless communication module 1160 may provide a solution that is applied to the electronic device 1100 and that includes wireless communication such as a wireless local area network Tireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near-field communication, NFC), and an infrared (infrared, IR) technology. The wireless communication module 1160 may be one or more components integrating at least one communication processing module. The wireless communication module 1160 receives an electromagnetic wave through the antenna 2, performs frequency modulation and filtering processing on an electromagnetic wave signal, and sends a processed signal to the processor 1110. The wireless communication module 1160 may further receive a to-be-sent signal from the processor 1110, perform frequency modulation and amplification on the signal, and convert a processed signal into an electromagnetic wave for radiation through the antenna 2.

In some embodiments, in the electronic device 1100, the antenna 1 and the mobile communication module 1150 are coupled, and the antenna 2 and the wireless communication module 1160 are coupled, so that the electronic device 1100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-synchronous code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system GPS), a global navigation satellite system (global navigation satellite system, GLONASS), a BeiDou navigation satellite system (BeiDou navigation satellite system BDS), a quasi-zenith satellite system (quasi-zenith satellite system, QZSS), and/or a satellite based augmentation system (satellite based augmentation system, SBAS).

The electronic device 1100 implements a display function by using the GPU, the display 1194, the application processor, and the like. The GPU is a microprocessor for image processing, and is connected to the display 1194 and the application processor. The GPU is configured to perform mathematical and geometric computation, and render an image. The processor 1110 may include one or more GPUs that execute program instructions to generate or change display information.

The display 1194 is configured to display an image, a video, and the like. The display 1194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, quantum dot light emitting diodes (quantum dot light emitting diodes, QLEDs), or the like. In some embodiments, the electronic device 1100 may include 11 or N displays 1194, where N is a positive integer greater than 11.

The electronic device 1100 may implement a photographing function by using the ISP, the camera 1193, the video codec, the GPU, the display 1194, the application processor, and the like.

The ISP is configured to process data fed back by the camera 1193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 1193.

The camera 1193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor, The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 1100 may include one or N cameras 1193, where N is a positive integer greater than 1.

The digital signal processor is configured to process a digital signal, and may process another digital signal in addition to the digital image signal. For example, when the electronic device 1100 selects a frequency, the digital signal processor is configured to perform Fourier transform on frequency energy.

The video codec is configured to compress or decompress a digital video. The electronic device 1100 may support one or more types of video codecs. In this way, the electronic device 1100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 1100 may be implemented by using the NPU, for example, image recognition, facial recognition, speech recognition, and text understanding.

The external memory interface 1120 may be configured to connect to an external storage card, for example, a micro SD card, to extend a storage capability of the electronic device 1100. The external storage card communicates with the processor 1110 through the external memory interface 1120, to implement a data storage function. For example, files such as music and a video are stored in the external storage card.

The internal memory 1121 may be configured to store computer-executable program code. The executable program code includes instructions. The processor 1110 runs the instructions stored in the internal memory 1121, to perform various function applications of the electronic device 1100 and data processing. The internal memory 1121 may include a program storage area and a data storage area. The program storage area may store an operating system, an application required by at least one function (for example, a sound playing function or an image playing function), and the like. The data storage area may store data (such as audio data and a phone book) created during use of the electronic device 1100, and the like. In addition, the internal memory 1121 may include a high speed random access memory, or may include a non-volatile memory, for example, at least one magnetic disk storage device, a flash memory, or a universal flash storage (universal flash storage, UFS).

The electronic device 1100 may implement an audio function, for example, music playing or recording, by using the audio module 1170, the speaker 1170A, the receiver 1170B, the microphone 1170C, the headset jack 1170D, the application processor, and the like.

The audio module 1170 is configured to convert digital audio information into an analog audio signal output, and is also configured to convert an analog audio input into a digital audio signal. The audio module 1170 may be further configured to encode and decode an audio signal. In some embodiments, the audio module 1170 may be disposed in the processor 1110, or some function modules of the audio module 1170 are disposed in the processor 1110.

The speaker 1170A, also referred to as a "loudspeaker", is configured to convert an audio electrical signal into a sound signal. The electronic device 1100 may be used to listen to music or answer a call in a hands-free mode over the speaker 1170A.

The receiver 1170B, also referred to as an "earpiece", is configured to convert an electrical audio signal into a sound signal. When a call is answered or audio information is listened to by using the electronic device 1100, the receiver 1170B may be put close to a human ear to listen to a voice.

The microphone 1170C, also referred to as a "mike" or a "mic", is configured to convert a sound signal into an electrical signal. When making a call or sending a voice message, a user may make a sound near the microphone 1170C through the mouth of the user, to input a sound signal to the microphone 1170C. At least one microphone 1170C may be disposed in the electronic device 1100. In some other embodiments, two microphones 1170C may be disposed in the electronic device 1100, to collect a sound signal and further implement a noise reduction function. In some other embodiments, three, four, or more microphones 1170C may be alternatively disposed in the electronic device 1100, to collect a sound signal, implement noise reduction, and identify a sound source, so as to implement a directional recording function and the like.

The headset jack 1170D is configured to connect to a wired headset. The headset jack 1170D may be a USB interface 1130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 1180A is configured to sense a pressure signal, and can convert the pressure signal into an electrical signal. In some embodiments, the pressure sensor 1180A may be disposed on the display 1194. There are many types of pressure sensors 1180A, such as a resistive pressure sensor, an inductive pressure sensor, and a capacitive pressure sensor. The capacitive pressure sensor may include at least two parallel plates made of conductive materials. When force is applied to the pressure sensor 1180A, capacitance between electrodes changes. The electronic device 1100 determines pressure intensity based on a capacitance change. When a touch operation is performed on the display 1194, the electronic device 1100 detects intensity of the touch operation through the pressure sensor 1180A. The electronic device 1100 may also calculate a touch location based on a detection signal of the pressure sensor 1180A. In some embodiments, touch operations that are performed in a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is executed.

The gyro sensor 1180B may be configured to determine a motion posture of the electronic device 1100. In some embodiments, angular velocities of the electronic device 1100 around three axes (namely, axes x, y, and z) may be determined by using the gyro sensor 1180B. The gyro sensor 1180B may be configured to implement image stabilization during photographing. For example, when the shutter is pressed, the gyro sensor 1180B detects an angle at which the electronic device 1100 jitters, calculates, based on the angle, a distance for which a lens module needs to compensate, and allows the lens to cancel the jitter of the electronic device 1100 through reverse motion, to implement image stabilization. The gyro sensor 1180B may be further used in a navigation scenario and a motion-sensing game scenario.

The barometric pressure sensor 1180C is configured to measure barometric pressure. In some embodiments, the electronic device 1100 calculates an altitude based on a barometric pressure value measured by the barometric pressure sensor 1180C, to assist in positioning and navigation.

The magnetic sensor 1180D includes a Hall sensor. The electronic device 1100 may detect opening and closing of a flip cover by using the magnetic sensor 1180D. In some embodiments, when the electronic device 1100 is a flip phone, the electronic device 1100 may detect opening or closing of the flip cover by using the magnetic sensor 1180D. Further, a feature, for example, automatic unlocking upon opening of the flip cover is set based on a detected opening or closing state of the flip cover.

The acceleration sensor 1180E may detect magnitude of accelerations in various directions (generally on three axes) of the electronic device 1100. When the electronic device 1100 is still, magnitude and a direction of gravity may be detected. The acceleration sensor 1180E may be further configured to identify a posture of the electronic device, and is used in an application such as switching between a landscape mode and a portrait mode or a pedometer.

The distance sensor 1180F is configured to measure a distance. The electronic device 1100 may measure a distance in an infrared manner or a laser manner. In some embodiments, in a photographing scenario, the electronic device 1100 may measure a distance by using the distance sensor 1180F, to implement quick focusing.

The optical proximity sensor 1180E may include, for example, a light-emitting diode (LED) and an optical detector, for example, a photodiode. The light-emitting diode may be an infrared light-emitting diode. The electronic device 1100 emits infrared light by using the light-emitting diode. The electronic device 1100 detects infrared reflected light from a nearby object by using the photodiode. When sufficient reflected light is detected, it may be determined that there is an object near the electronic device 1100. When insufficient reflected light is detected, the electronic device 1100 may determine that there is no object near the electronic device 1100. The electronic device 1100 may detect, by using the optical proximity sensor 1180G, that the user holds the electronic device 1100 close to an ear for a call, to automatically turn off a screen for power saving. The optical proximity sensor 1180G may also be used in a smart cover mode or a pocket mode to automatically perform screen unlocking or locking.

The ambient light sensor 1180L is configured to sense ambient light brightness. The electronic device 1100 may adaptively adjust brightness of the display 1194 based on the sensed ambient light brightness. The ambient light sensor 1180L may also be configured to automatically adjust a white balance during photographing. The ambient light sensor 1180L may also cooperate with the optical proximity sensor 1180G to detect whether the electronic device 1100 is in a pocket, to avoid an accidental touch.

The fingerprint sensor 1180H is configured to collect a fingerprint. The electronic device 1100 may use a feature of the collected fingerprint to implement fingerprint-based unlocking, application lock access, fingerprint-based photographing, fingerprint-based call answering, and the like.

The temperature sensor 1180J is configured to detect a temperature. In sonic embodiments, the electronic device 1100 executes a temperature processing policy based on the temperature detected by the temperature sensor 1180J. For example, when the temperature reported by the temperature sensor 1180J exceeds a threshold, the electronic device 1100 lowers performance of a processor near the temperature sensor 1180J, to reduce power consumption and implement thermal protection. In some other embodiments, when the temperature is less than another threshold, the electronic device 1100 heats the battery 1142 to prevent the electronic device 1100 from being shut down abnormally due to a low temperature. In some other embodiments, when the temperature is less than still another threshold, the electronic device 1100 boosts an output voltage of the battery 1142 to avoid abnormal shutdown due to a low temperature.

The touch sensor 1180K is also referred to as a "touch panel", The touch sensor 1180K may be disposed on the display 1194, and the touch sensor 1180K and the display 1194 constitute a touchscreen, which is also referred to as a "touch screen". The touch sensor 1180K is configured to detect a touch operation performed on or near the touch sensor. The touch sensor may transfer the detected touch operation to the application processor to determine a type of a touch event. A visual output related to the touch operation may be provided through the display 1194. In some other embodiments, the touch sensor 1180K may be alternatively disposed on a surface of the electronic device 1100 at a location different from a location of the display 1194.

The bone conduction sensor 1180M may obtain a vibration signal. In some embodiments, the bone conduction sensor 1180M may obtain a vibration signal of a vibration bone of a human vocal-cord part. The bone conduction sensor 1180M may also be in contact with a body pulse to receive a blood pressure beating signal. In some embodiments, the bone conduction sensor 1180M may be alternatively disposed in a headset, to constitute a bone conduction headset. The audio module 1170 may obtain a voice signal through parsing based on the vibration signal that is of the vibration bone of the vocal-cord part and that is obtained by the bone conduction sensor 1180M, to implement a voice function. The application processor may parse heart rate information based on the blood pressure beating signal obtained by the bone conduction sensor 1180M, to implement a heart rate detection function.

The button 1190 includes a power button, a volume button, and the like. The button 1190 may be a mechanical button or a touch button. The electronic device 1100 may receive a button input, and generate a button signal input related to a user setting and function control of the electronic device 1100.

The motor 1191 may generate a vibration prompt. The motor 1191 may be configured to produce an incoming call vibration prompt and a touch vibration feedback. For example, touch operations performed on different applications (for example, photographing and audio playing) may correspond to different vibration feedback effects. For touch operations performed on different areas of the display 1194, the motor 1191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 1192 may be an indicator light, and may be configured to indicate a charging status and a power change, or may be configured to indicate a message, a missed call, a notification, and the like.

The SIM card interface 1195 is configured to connect to a SIM card. The SIM card may be inserted into the SIM card interface 1195 or removed from the SIM card interface 1195, to implement contact with or separation from the electronic device 1100. The electronic device 1100 may support one or N SIM card interfaces, where N is a positive integer greater than 1. The SIM card interface 1195 may support a nano-SIM card, a micro-SIM card, a SIM card, and the like. A plurality of cards may be inserted into a same SIM card interface 1195 at the same time. The plurality of cards may be of a same type or may different types. The SIM card interface 1195 may also be compatible with different types of SIM cards. The SIM card interface 1195 may also be compatible with an external storage card. The electronic device 1100 interacts with a network through the SIM card, to implement functions such as calling and data communication. In some embodiments, the electronic device 1100 uses an eSIM, namely, an embedded SIM card. The eSIM card may be embedded in the electronic device 1100, and cannot be separated from the electronic device 1100.

A software system of the electronic device 1100 may use a layered architecture, an event-driven architecture, a micro-kernel architecture, a micro service architecture, or a cloud architecture. In this embodiment of the present invention, an Android system of a layered architecture is used as an example to illustrate a software structure of the electronic device 1100.

Figure 12:
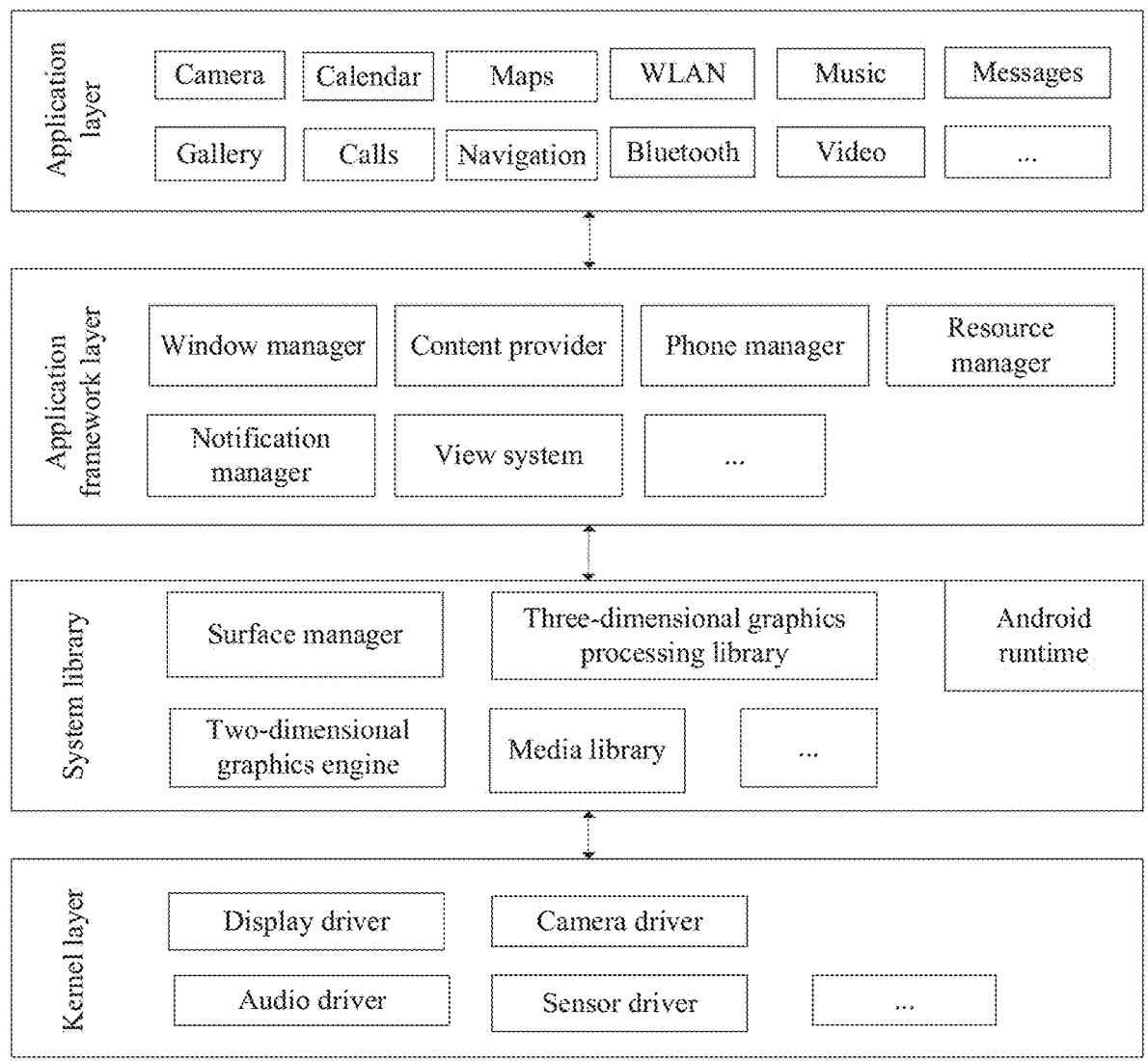
FIG. 12 is a block diagram of a software structure of an electronic device according to an embodiment of this application.

FIG. 12 is a block diagram of a software structure of an electronic device 1100 according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 12, the application program package may include application programs such as Camera, Gallery, Calendar, Calls, Map, Navigation, WLAN, Bluetooth, Music, Video, and Messages.

The application framework layer provides an application programming interface (application programming interface, API) and a programming framework for an application at the application layer. The application framework layer includes some predefined functions.

As shown in FIG. 12, the application framework layer ma include a window manager, a content provider, a view system, a phone manager, a resource manager, a notification manager, and the like.

The window manager is used to manage a window program. The window manager may obtain a size of the display, determine whether there is a status bar, perform screen locking, take a screenshot, and the like.

The content provider is used to store and obtain data, and enable the data to be accessed by an application. The data may include a video, an image, audio, calls that are made and answered, a browsing history, a bookmark, a phone book, and the like.

The view system includes visual controls, such as a control for displaying a text and a control for displaying an image. The view system may be used to construct an application. A display interface may include one or more views, For example, a display interface including an SMS message notification icon may include a text display view and an image display view.

The phone manager is used to provide a communication function of the electronic device 1100, for example, management of a call status (including answering, declining, or the like).

The resource manager provides, for an application, various resources such as a localized character string, an icon, an image, a layout file, and a video file.

The notification manager enables an application to display notification information in a status bar, and may be used to convey a notification message. The notification manager may automatically disappear after a short pause without user interaction. For example, the notification manager is used to notify download completion, provide a message notification, and the like. The notification manager may be alternatively a notification that appears in a top status bar of the system in a form of a graph or a scroll bar text, for example, a notification of an application that is run in the background, or may be a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in a Java language, and a kernel library of Android.

The application layer and the application framework layer run on the virtual machine. The virtual machine executes Java files at the application layer and the application framework layer as binary files. The virtual machine is used to perform functions such as object lifecycle management, stack management, thread management, security and exception management, and garbage collection.

The system library may include a plurality of function modules, for example, a surface manager (surface manager), a media library (Media Library), a three-dimensional graphics processing library (for example, an OpenGL ES), and a 2D graphics engine (for example, an SGL).

The surface manager is used to manage a display subsystem and provide fusion of 2D and 3D layers for a plurality of applications.

The media library supports playback and recording in a plurality of frequently used audio and video formats, a static image file, and the like. The media library may support a plurality of audio and video encoding formats, for example, MPEG-4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

What is claimed is:

1. An appearance analysis method implemented by an electronic device, wherein the appearance analysis method comprises:
    obtaining a first image associated with a first region of an object, wherein the first image is from a first camera;
    obtaining a second image associated with a second region of the object, wherein the second image is from a second camera; and
    providing, based on the first image and the second image, a first appearance evaluation of the object by:
        presenting a model of the object that is based on the first image and the second image, wherein the model of the object comprises a three-dimensional model of the object;
        presenting first text at a first location of the model, wherein the first text identifies a first evaluation type and a first score of the first evaluation type, wherein the first evaluation type comprises a first skin condition, wherein the first location is associated with the first evaluation type, and wherein the first location is proximate to a tail of an eye on the three-dimensional model; and
        presenting second text at a second location of the model, wherein the second text identifies a second evaluation type and a second score of the second evaluation type, wherein the second skin evaluation type comprises a second skin condition, wherein the second location is associated with the second evaluation type, and wherein the second location is proximate to a nasolabial fold of the three-dimensional model.

2. The appearance analysis method of claim 1, further comprising providing an instruction to adjust a position of the object or a posture of the object when the position or the posture does not meet an image collection condition of the first camera or the second camera.

3. The appearance analysis method of claim 1, further comprising adjusting, based on a feature of the object, a collection parameter of the first camera or the second camera, wherein the collection parameter comprises a photographing angle or a focal length.

4. The appearance analysis method of claim 1, further comprising symmetrically arranging the first camera and the second camera on opposite sides of an image collection device.

5. The appearance analysis method of claim 4, further comprising obtaining a third image associated with a third region of the object, wherein the third image is from a third camera, wherein the third camera is disposed on the image collection device, and wherein a first distance between the third camera and the first camera and a second distance between the third camera and the second camera are the same.

6. The appearance analysis method of claim 1, wherein providing, based on the first image and the second image, the first appearance evaluation of the object comprises:
    identifying a third region of interest from the first image, wherein the third region represents a first group of appearance features of the object;
    identifying a fourth region of interest from the second image, wherein the fourth region represents a second group of appearance features of the object; and
    calculating, based on the third region and the fourth region, the first appearance evaluation.

7. The appearance analysis method of claim 6, wherein when the third region and the fourth region comprise an overlapping region, calculating, based on the third region and the fourth region, the first appearance evaluation comprises:
    calculating, based on the third region, a second appearance evaluation corresponding to the overlapping region;
    calculating, based on the fourth region, a third appearance evaluation corresponding to the overlapping region; and
    calculating, based on the second appearance evaluation and the third appearance evaluation, the first appearance evaluation.

8. A terminal device, comprising:
    a memory configured to store instructions; and
    one or more processors coupled to the memory and configured to execute the instructions to:
        obtain a first image associated with a first region of an object, wherein the first image is from a first camera;
        obtain a second image associated with a second region of the object, wherein the second image is from a second camera; and
        provide, based on the first image and the second image, a first appearance evaluation of the object by:

presenting a model of the object that is based on the first image and the second image, wherein the model of the object comprises a three-dimensional model of the object;

presenting first text at a first location of the model, wherein the first text identifies a first evaluation type and a first score of the first evaluation type, wherein the first evaluation type comprises a first skin condition, wherein the first location is associated with the first evaluation type, and wherein the first location is proximate to a tail of an eye on the three-dimensional model; and presenting second text at a second location of the model, wherein the second text identifies a second evaluation type and a second score of the second evaluation type, wherein the second skin evaluation type comprises a second skin condition, wherein the second location is associated with the second evaluation type, and wherein the second location is proximate to a nasolabial fold of the three-dimensional model.

9. The terminal device of claim 8, wherein the one or more processors are further configured to execute the instructions to provide an instruction to adjust a position of the object or a posture of the object when the position or the posture does not meet an image collection condition of the first camera or the second camera.

10. The terminal device of claim 8, wherein the one or more processors are further configured to execute the instructions to adjust, based on a feature of the object, a collection parameter of the first camera or the second camera, and wherein the collection parameter comprises a photographing angle or a focal length.

11. The terminal device of claim 8, wherein the one or more processors are further configured to execute the instructions to obtain a third image associated with a third region of the object, wherein the third image is from a third camera, wherein the third camera is disposed on an image collection device, and wherein a first distance between the third camera and the first camera and a second distance between the third camera and the second camera are the same.

12. The terminal device of claim 8, wherein the one or more processors are further configured to execute the instructions to calculate, based on the first region and the second region, the first appearance evaluation of the object by:

identifying a third region of interest from the first image, wherein the third region represents a first group of appearance features of the object;

identifying a fourth region of interest from the second image, wherein the fourth region represents a second group of appearance features of the object; and calculating, based on the third region and the fourth region, the first appearance evaluation.

13. The terminal device of claim 12, wherein when the third region and the fourth region comprise an overlapping region, the one or more processors are further configured to execute the instructions to calculate, based on the third region and the fourth region, the first appearance evaluation by:

calculating, based on the third region, a second appearance evaluation corresponding to the overlapping region;

calculating, based on the fourth region, a third appearance evaluation corresponding to the overlapping region; and calculating, based on the second appearance evaluation and the third appearance evaluation, the first appearance evaluation.

14. A computer program product comprising instructions stored on a non-transitory computer-readable medium that, when executed by one or more processors, cause an electronic device to:

obtain a first image associated with a first region of an object, wherein the first image is from a first camera;

obtain a second image associated with a second region of the object, wherein the second image is from a second camera; and provide, based on the first image and the second image, a first appearance evaluation of the object by:

presenting a model of the object that is based on the first image and the second image, wherein the model of the object comprises a three-dimensional model of the object;

presenting first text at a first location of the model, wherein the first text identifies a first evaluation type and a first score of the first evaluation type, wherein the first evaluation type comprises a first skin condition, wherein the first location is associated with the first evaluation type, and wherein the first location is proximate to a tail of an eye on the three-dimensional model; and presenting second text at a second location of the model, wherein the second text identifies a second evaluation type and a second score of the second evaluation type, wherein the second skin evaluation type comprises a second skin condition, wherein the second location is associated with the second evaluation type, and wherein the second location is proximate to a nasolabial fold of the three-dimensional model.

15. The computer program product of claim 14, wherein the one or more processors are further configured to execute the instructions to cause the electronic device to adjust a position of the object or a posture of the object when the position or the posture does not meet an image collection condition of the first camera or the second camera.

16. The computer program product of claim 14, wherein the one or more processors are further configured to execute the instructions to cause the electronic device to adjust, based on a feature of the object, a collection parameter of the first camera or the second camera, and wherein the collection parameter comprises a photographing angle or a focal length.

17. The appearance analysis method of claim 1, further comprising presenting an overall score that is based on the first score and the second score, wherein the first score, the second score, and the overall score are simultaneously presented, and wherein the first score, the second score, and the overall score are numerical scores.

* * * * *